US012596521B1

(12) United States Patent
Chen et al.

(10) Patent No.: US 12,596,521 B1
(45) Date of Patent: Apr. 7, 2026

(54) METHOD AND SYSTEM FOR LOUDNESS COMPENSATION

(71) Applicant: Apple Inc., Cupertino, CA (US)

(72) Inventors: Zhangli Chen, San Jose, CA (US); Brandon J. Rice, Pacifica, CA (US); Jarrett B. Lagler, San Francisco, CA (US); Jakub Mazur, Daly City, CA (US)

(73) Assignee: Apple Inc., Cupertino, CA (US)

( * ) Notice: Subject to any disclaimer, the term of this patent is extended or adjusted under 35 U.S.C. 154(b) by 321 days.

(21) Appl. No.: 18/344,675

(22) Filed: Jun. 29, 2023

Related U.S. Application Data

(60) Provisional application No. 63/357,591, filed on Jun. 30, 2022.

(51) Int. Cl.
*G06F 3/16* (2006.01)
*H04R 3/00* (2006.01)

(52) U.S. Cl.
CPC .............. *G06F 3/165* (2013.01); *H04R 3/00* (2013.01); *H04R 2430/01* (2013.01)

(58) Field of Classification Search
CPC ........ G06F 3/165; H04R 3/00; H04R 2430/01
USPC ......................................................... 381/104
See application file for complete search history.

(56) References Cited

U.S. PATENT DOCUMENTS

| | | | |
|---|---|---|---|
| 10,609,483 B2 | 3/2020 | Yan | |
| 11,172,294 B2 | 11/2021 | Stark | |
| 2011/0164855 A1 | 7/2011 | Crockett et al. | |
| 2013/0223636 A1* | 8/2013 | Amada ................ | H04R 29/001 |
| | | | 381/58 |
| 2015/0003649 A1* | 1/2015 | Horbach ................ | H04R 29/00 |
| | | | 381/309 |
| 2015/0104036 A1* | 4/2015 | Mori ...................... | H04R 5/033 |
| | | | 381/74 |
| 2015/0281830 A1 | 10/2015 | Gauger, Jr. et al. | |
| 2017/0094409 A1* | 3/2017 | Baumgarte ........... | G10L 19/167 |
| 2020/0107121 A1 | 4/2020 | Choisel et al. | |

* cited by examiner

*Primary Examiner* — William J Deane, Jr.
(74) *Attorney, Agent, or Firm* — Aikin & Gallant, LLP

(57) ABSTRACT
A method performed by an audio system that includes a headset for playing back audio, the method includes receiving an audio signal having audio content, determining a characteristic of the audio content, determining a parameter of the headset, producing a filtered audio signal by applying an equalization (EQ) filter to the audio signal based on the characteristic of the audio content and the parameter of the headset, and driving one or more speakers of the headset with the filtered audio signal.

20 Claims, 8 Drawing Sheets

Loudness Compensation Graph 50

EQ Filter Gain Curves 51

Top Curve Associated with a Second Volume Setting Threshold 53

Bottom Curve Associated with a First Volume Setting Threshold 52

Gain (dB)

$G_4$ $G_3$ $f_1$      $f_2$      $f_3$

Frequency (Hz)

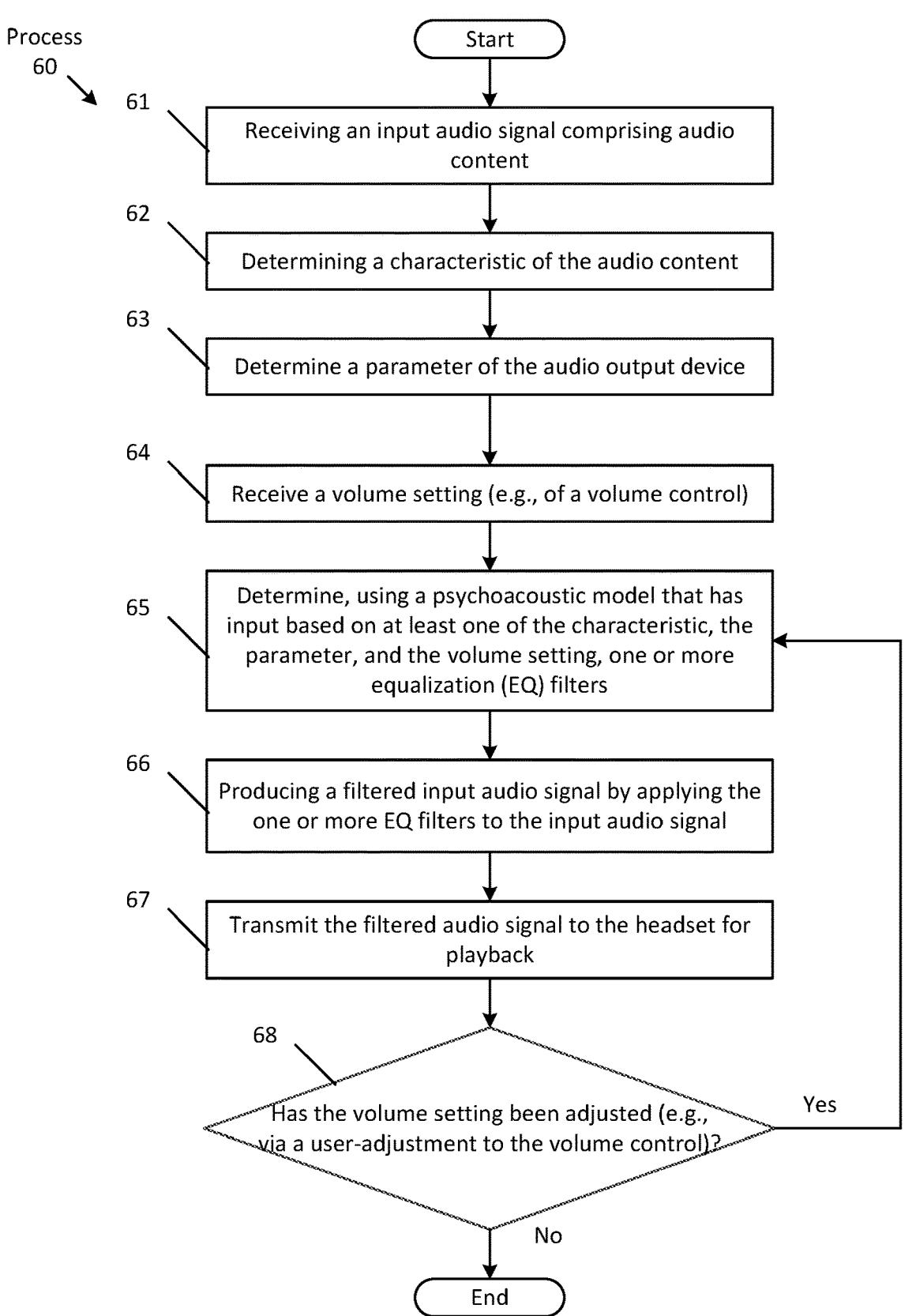

Process
60

61
Receiving an input audio signal comprising audio content

62
Determining a characteristic of the audio content

63
Determine a parameter of the audio output device

64
Receive a volume setting (e.g., of a volume control)

65
Determine, using a psychoacoustic model that has input based on at least one of the characteristic, the parameter, and the volume setting, one or more equalization (EQ) filters 66
Producing a filtered input audio signal by applying the one or more EQ filters to the input audio signal 67
Transmit the filtered audio signal to the headset for playback 68
Has the volume setting been adjusted (e.g., via a user-adjustment to the volume control)?

Yes

No

Start

End

FIG. 6

Process
80

METHOD AND SYSTEM FOR LOUDNESS COMPENSATION

CROSS-REFERENCE TO RELATED APPLICATION

This application claims the benefit of and priority to U.S. Provisional Patent Application No. 63/357,591, filed Jun. 30, 2022, which is hereby incorporated by this reference in its entirety.

FIELD

An aspect of the disclosure relates to a method and a system for loudness compensation. Other aspects are also described.

BACKGROUND

Headphones are audio devices that include a pair of speakers, each of which is placed on top of a user's ear when the headphones are worn on or around the user's head. Similar to headphones, earphones (or in-ear headphones) are two separate audio devices, each having a speaker that is inserted into the user's ear. Headphones and earphones are normally wired to a separate playback device, such as a digital audio player, which drives each of the speakers of the devices with an audio signal in order to produce sound (e.g., music). Headphones and earphones provide a convenient method by which a user can individually listen to audio content, while not having to broadcast the audio content to others who are nearby.

SUMMARY

An aspect of the disclosure is a method performed by (e.g., a programmed processor of) an audio system that includes a headset (e.g., in-ear, on-ear, over-the-ear headphones). The audio system receives an audio signal having (e.g., user-desired) audio content, such as a musical composition, a sound track to a motion picture, etc. In particular, the audio content may be wideband content (e.g., having spectral content that spans across several frequency bands), in contrast to a single band (or pure tone) audio content. The system determines a characteristic of the audio content. For example, when the audio content is a musical composition, the system may determine characteristics of the composition, such as a genre (e.g., whether rock, classical, etc.) of music. In another aspect, the characteristic may be a determination of spectral content associated with the audio content (e.g., based on a spectral analysis of the audio signal). In some aspects, the determination of the characteristic may be based on metadata that is associated with the audio signal (e.g., where the metadata may indicate a title of the musical composition, the genre, etc.). The system determines a parameter of the headset. For instance, the parameter may be a model (e.g., a model number) associated with the headset. As another example, the parameter may include other (e.g., identifying) information regarding the headset, such as the manufacturer of the headset, a frequency response associated with the headset, etc. The system produces a filtered audio signal by applying an equalization (EQ) filter to the audio signal based on the characteristic of the audio signal and the parameter. In one aspect, the system may generate the EQ filter by using a psychoacoustic model of a (e.g., average) person's auditory system that has input based on the characteristic and the parameter. The system uses the filtered audio signal to drive one or more speakers of the headset.

In one aspect, sound of the filtered audio signal produced by the one or more speakers has a desired tonal balance perceived by a user of the headset. In some aspects, the sound is produced at a first playback output level, wherein the desired tonal balance is a tonal balance of sound produced at a second playback output level. In another aspect, the first playback output level is associated with a first volume setting of and the second playback output level is associated with a second volume setting that is different than the first volume setting. In one aspect, the second volume setting is higher than the first volume setting. In another aspect, the system determines that the first volume setting has changed, determines a different EQ filter based on the changed volume setting, produces a new filtered audio signal by applying the different EQ filter, and uses the new filtered audio signal to drive the one or more speakers of the headset to produce sound at a third playback output level while maintaining the tonal balance perceived by the user of the headset.

In one aspect, generating the EQ filter includes determining several EQ filters as output of the psychoacoustic model responsive to the characteristic and parameter of the headset as input, determining a volume setting of the audio system, and selecting the EQ filter based on the volume setting. In some aspects, the system receives an adjustment to the volume setting, determines whether the adjustment to the volume setting is equal to or below a volume setting threshold, responsive to the adjustment to the volume setting being equal to a volume setting threshold, using the audio signal to drive the one or more speakers with, and responsive to the adjustment to the volume setting being less than the volume setting threshold, determining a new EQ filter according to the adjustment of the volume setting. For example, the new EQ filter may be determined by selecting the filter from the several EQ filters that are determined as output of the model. In another aspect, the volume setting threshold is a first volume threshold, the volume setting is a second volume threshold that is less than the first volume threshold, responsive to the adjustment being less than the second volume threshold, continuing to produce the filtered audio signal by applying the first and second EQ filters to the audio signal. In another aspect, responsive to the adjustment to volume setting being greater than the volume setting threshold, continuing to drive the one or more speakers with the audio signal. In some aspects, continuing to drive the one or more speakers with the audio signal comprises ceasing to apply the EQ filter to the audio signal. In some aspects, the volume setting threshold defies a playback output level at or near the one or more speakers to 85 dB sound pressure level (SPL).

According to another aspect of the invention, a method performed by an audio system that includes a headset for playing back audio. The system receives an audio signal having audio content, the audio signal for driving one or more speakers of the headset, receives a volume setting of the headset, determines, using a psychoacoustic model that has input based on the audio content and the volume setting, a first equalization (EQ) filter and a second EQ filter, the first EQ filter with a first frequency response that includes a first gain across a first frequency range, and the second EQ filter with a second frequency response that includes a second gain across a second frequency range that is higher than the first frequency range, produces a filtered audio signal by applying the first and second EQ filters to the audio signal.

In one aspect, the first frequency range may be a low-frequency range and the second frequency range may be a high-frequency range that does not overlap the low-frequency range. In another aspect, the first gain may be between 0 dB and a first gain threshold, and the second gain may be between 0 dB and a second gain threshold that may be less than the first gain threshold. In some aspects, the first gain threshold may be 20 dB and the second gain threshold is 10 dB. In one aspect, the first EQ filter is a low shelving filter, and the second EQ filter is a high shelving filter. In some aspects, the first and second EQ filters define an optimal perceived loudness and tonal balance for the filtered audio signal according to the volume setting. In one aspect, the filtered audio signal has a same tonal balance as the audio signal. In another aspect, the volume setting is a first volume setting and the filtered audio signal is a first filtered audio signal, wherein the method further comprises receiving a second volume setting that is less than the first volume setting; determining, using the psychoacoustic model that has input based on the audio content and the second volume setting, at least one of a third EQ filter and a fourth EQ filter; and producing a second filtered audio signal by applying the at least one of the third and fourth EQ filters to the audio signal, wherein the second filtered audio signal has a same tonal balance as the first filtered audio signal. In one aspect, the system determines a characteristic of the audio content, wherein the first and second EQ filters are determined as output of the psychoacoustic model responsive to input based on the characteristic and the volume setting.

The above summary does not include an exhaustive list of all aspects of the disclosure. It is contemplated that the disclosure includes all systems and methods that can be practiced from all suitable combinations of the various aspects summarized above, as well as those disclosed in the Detailed Description below and particularly pointed out in the claims. Such combinations may have particular advantages not specifically recited in the above summary.

BRIEF DESCRIPTION OF THE DRAWINGS

The aspects are illustrated by way of example and not by way of limitation in the figures of the accompanying drawings in which like references indicate similar elements. It should be noted that references to "an" or "one" aspect of this disclosure are not necessarily to the same aspect, and they mean at least one. Also, in the interest of conciseness and reducing the total number of figures, a given figure may be used to illustrate the features of more than one aspect, and not all elements in the figure may be required for a given aspect.

FIG. 6 is a flowchart of a process for performing loudness compensation according to one aspect.

DETAILED DESCRIPTION

Figure 1:
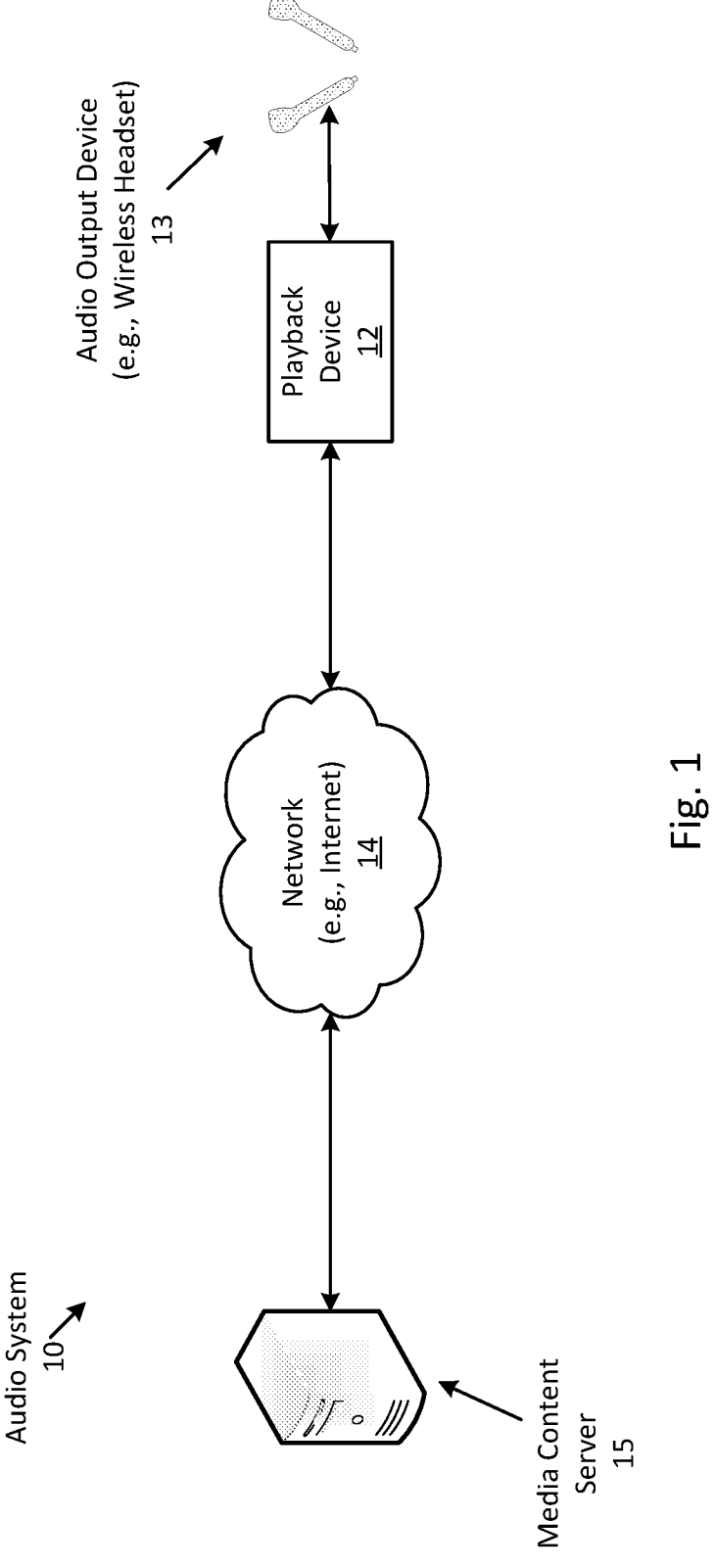
FIG. 1 shows a block diagram of an audio system according to one aspect.

Several aspects of the disclosure with reference to the appended drawings are now explained. Whenever the shapes, relative positions and other aspects of the parts described in a given aspect are not explicitly defined, the scope of the disclosure here is not limited only to the parts shown, which are meant merely for the purpose of illustration. Also, while numerous details are set forth, it is understood that some aspects may be practiced without these details. In other instances, well-known circuits, structures, and techniques have not been shown in detail so as not to obscure the understanding of this description. Furthermore, unless the meaning is clearly to the contrary, all ranges set forth herein are deemed to be inclusive of each range's endpoints.

Audio content such as musical compositions (music) or soundtracks of a movie are usually produced with the assumption of (or at) a certain playback (or reference) level (e.g., the "overall gain" that should be applied to the audio signal during playback, between its initial or decoded form to when it is converted into sound by a speaker, in order to obtain a sound pressure level at the listener's position (or ear) that is the same as what was intended by the producer of the audio content). For example, audio content may be mastered (e.g., by an audio content producer) to have a specific tonal balance at a particular (or around a) playback (or reference) level (e.g., 85 decibels of sound pressure level (dB SPL)) of the audio content. If a different playback level is used, the audio content may not only sound louder or quieter, but it may also appear to have a different tonal characteristic (or balance) than when the audio content is played back at the reference level. For example, although music may be produced to be played back at a certain reference level, a listener may listen to the music at a lower level in certain situations (e.g., when the listener is in a quiet room verses a room with a lot of ambient noise). This may result in certain frequency components, such as low frequency (e.g., bass) components and high frequency (e.g., treble) components being perceived by the listener as being weaker (or less audible) than mid-frequency components. As a result, a user's listening experiences may not be optimal at playback levels that may be lower than the reference level.

Conventional loudness equalization methods involve determining an equalization filter that amplifies the low frequency range depending on the volume level based on equal-loudness contours (ELCs). ELCs are curves that represent sound pressure level (SPL) over a frequency range, at which pure steady tones are perceived by people as being equally loud. Audio content, such as music, however, may be wideband sound (e.g., covering a wide frequency range), as opposed to being a single frequency tone. As a result, audio content that is filtered using EQ filters that are derived from ELCs do not provide an accurate audible representation (e.g., having a desired tonal balance) at given loudness levels. Therefore, there is a need for a loudness compensation method that produces more accurate EQ filters in order to provide an optimal listening experience at different loudness levels.

To overcome these deficiencies, the present disclosure describes an audio system for performing loudness compensation to improve tonal balance (e.g., bass and/or treble) of audio content at various playback levels. Specifically, the audio system may be configured to determine one or more (loudness compensation) EQ filters such that the tonal balance of audio content may be consistent (e.g., within a margin of error) between different playback (e.g., volume) levels. In one aspect, the system receives an audio signal having audio content, such as music or a movie sound track that is wideband audio content. The system determines a characteristic of the audio content (e.g., the genre of the music, etc.) and determines a parameter of an output device (e.g., headset) of the audio system, such as a model of the headset. The system produces a filtered audio signal by applying an EQ filter to the audio signal based on the characteristic and the parameter. For example, the system may apply the characteristic and parameter into a psycho-acoustic model that produces the EQ filter (or coefficients associated with the filter) as output. The system drives one or more speakers of the headset with the filtered audio signal. As a result, sound produced by the headset may have a desired tonal balance (e.g., which may have been defined by the audio content producer and/or by a listener) at a particular loudness (and/or across one or more different playback levels), as perceived by the listener of the audio system (e.g., the wearer of the headset). Moreover, since the psychoacoustic model is taking into account the model of the headset (and/or other parameters associated with the headset), the audio system is able to compensate for differences between headsets (e.g., compensating for different headset sensitivities and/or frequency responses). As a result, the audio system is able to provide a consistent listening experience between various playback levels, as well as between multiple (different) output devices, such as headsets.

FIG. 1 shows a block diagram of a system (or audio system) 10 according to one aspect. Specifically, the system 10 includes a playback device 12, an audio output device (or output device) 13, a (e.g., computer) network (e.g., the Internet) 14, and a media content server 15. In one aspect, the system may include more or fewer elements, such as having additional content servers, or not including content servers and/or a playback device. In which case, the output device may perform all (or most) of the audio signal processing operations, as described herein.

In one aspect, the media content server 15 may be a stand-alone electronics server, a computer (e.g., desktop computer), or a cluster of server computers that are configured to store, stream, and/or receive digital content, such as audio content (e.g., as one or more audio signals in any audio format). In another aspect, the content server may store video and/or audio content, such as movies, for streaming (transmitting) to one or more electronic devices. As shown, the server is communicatively coupled (e.g., via the network 14) to the playback device 12 in order to stream (e.g., audio) content for playback (e.g., via the output device). In another aspect, the content server may be communicatively coupled (e.g., directly) to the output device 13.

In one aspect, the playback device 12 may be any electronic device (e.g., with electronic components, such as one or more processors, memory, etc.) that is capable of streaming audio content, in any format, such as stereo audio signals and/or multi-channel audio content (e.g., surround sound format), for playback (e.g., via one or more speakers integrated within the playback device and/or via one or more output devices, as described herein). For example, the playback device may be a desktop computer, a laptop computer, a digital media player, etc. In one aspect, the device may be a portable electronic device (e.g., being handheld operable), such as a tablet computer, a smart phone, etc.

In one aspect, the audio output device 3 may be any (e.g., portable) electronic device that includes at least one speaker and is configured to output (or playback) sound by driving the speaker(s) with audio signal(s). For instance, as illustrated the device is a wireless headset (e.g., in-ear headphones or earphones) that are designed to be positioned on (or in) a user's ears and are designed to output sound into the user's ear canal. In some aspects, the earphone may be a sealing type that has a flexible ear tip that serves to acoustically seal off the entrance of the user's ear canal from an ambient environment by blocking or occluding in the ear canal. As shown, the output device includes a left earphone for the user's left ear and a right earphone for the user's right ear. In this case, each earphone may be configured to output at least one audio channel of audio content (e.g., the right earphone outputting a right audio channel and the left earphone outputting a left audio channel of a two-channel input of a stereophonic recording, such as a musical work). In another aspect, the output device may be any electronic device that includes at least one speaker and is arranged to be worn by the user and arranged to output sound by driving the speaker with an audio signal. As another example, the output device may be any type of headset, such as an over-the-ear (or on-the-ear) headset that at least partially covers the user's ears and is arranged to direct sound into the ears of the user. In another aspect, the output device may be a wearable electronic device, such as smart glasses or a smart watch.

In some aspects, the output device 13 may be a head-worn device, as illustrated herein. In another aspect, the output device may be any electronic device that is arranged to output sound into an ambient environment. Examples may include a stand-alone speaker, a smart speaker, a home theater system, or an infotainment system that is integrated within a vehicle. In another aspect, the output device as a head-worn device may be arranged to output sound into the ambient environment. For instance, when the output device is a pair of smart glasses, the output device may include "extra-aural" speakers that are arranged to project sound into the ambient environment, which are in contrast to "inter-aural" speakers of a pair of headphones that are arranged to project sound into (or towards) a user's ear (or ear canal) when worn.

As described herein, the output device 13 may be a wireless device that may be communicatively coupled to the playback device 12 in order to exchange (e.g., audio) data. For instance, the playback device may be configured to establish the wireless connection with the output device via a wireless communication protocol (e.g., BLUETOOTH protocol or any other wireless communication protocol). During the established wireless connection, the playback device may exchange (e.g., transmit and receive) data packets (e.g., Internet Protocol (IP) packets) with the output device, which may include audio digital data in any audio format for playback by one or more of the audio output device's speakers.

In another aspect, the playback device 12 may communicatively couple with the output device 13 via other methods. For example, both devices may couple via a wired connection. In this case, one end of the wired connection may be (e.g., fixedly) connected to the output device, while another end may have a connector, such as a media jack or a universal serial bus (USB) connector, which plugs into a socket of the playback device. Once connected, the playback device may be configured to drive one or more speakers of the output device with one or more audio signals, via the wired connection. For instance, the playback device may transmit the audio signals as digital audio (e.g., PCM digital audio). In another aspect, the audio data may be transmitted in analog format.

In some aspects, the playback device 12 and the output device 13 may be distinct (separate) electronic devices, as shown herein. In another aspect, the playback device may be a part of (or integrated with) the output device. For example, at least some of the components of the playback device (such as one or more processors, memory, etc.) may be part of the output device, and/or at least some of the components of the output device may be part of the playback device. In which case, at least some of the operations performed by the playback device (e.g., performing loudness compensation operations) may be performed by the output device. More about these operations is described herein.

Figure 2:
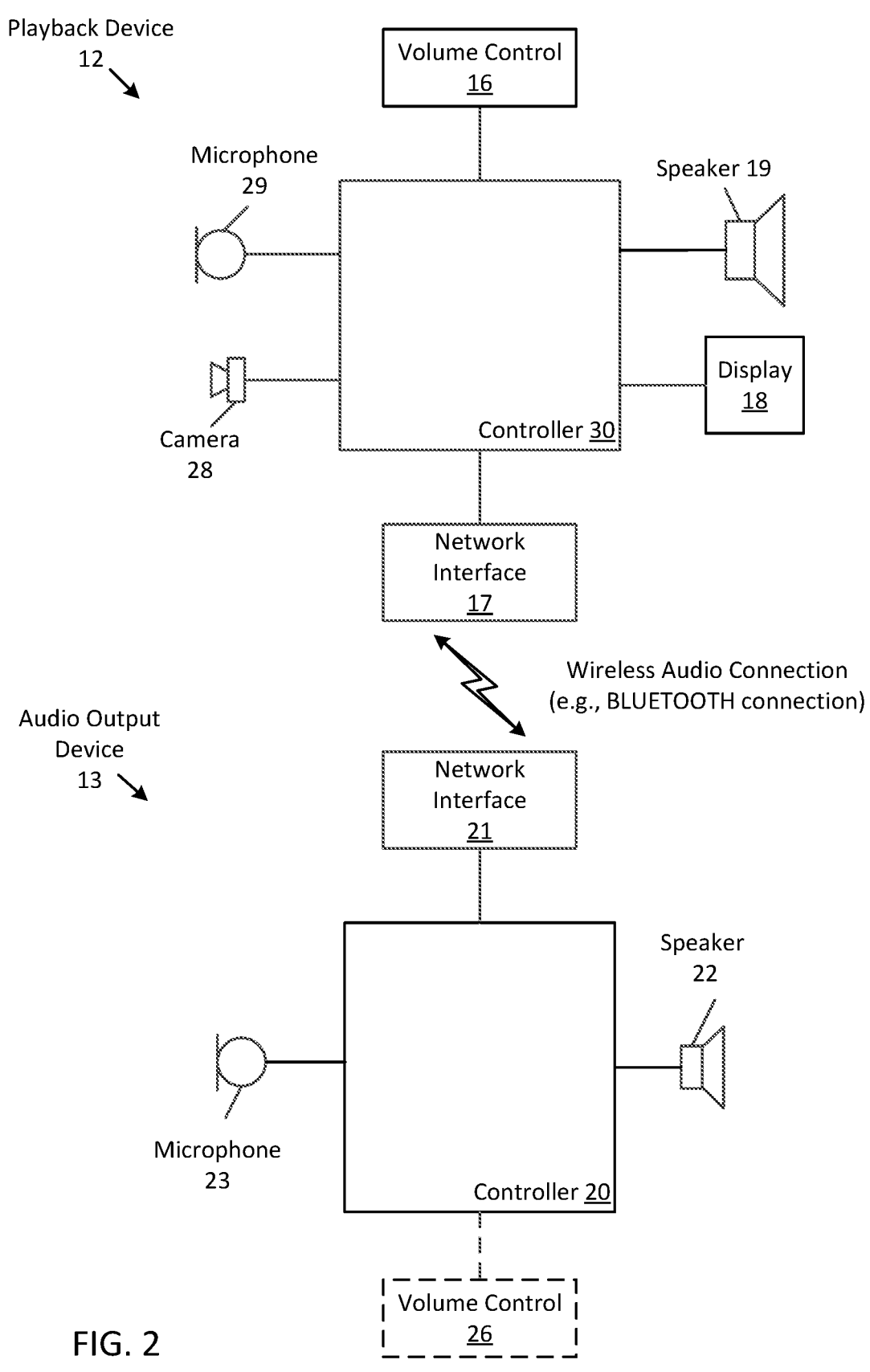
FIG. 2 shows a block diagram of a playback device and an audio output device of the audio system according to one aspect.

FIG. 2 shows a block diagram of the playback device 12 that performs loudness compensation, and shows of an audio output device 13 that wirelessly communicates with the playback device 12 according to one aspect. The playback device 12 includes a controller 30, a network interface 17, a speaker 19, a display 18, a volume control 16, a microphone 29, and a camera 28. In one aspect, the playback device may include more or less elements as described herein. For instance, the device may include two or more of at least some of the elements, such as having two or more microphones and/or two or more speakers.

The controller 30 may be a special-purpose processor such as an application-specific integrated circuit (ASIC), a general-purpose microprocessor, a field-programmable gate array (FPGA), a digital signal controller, or a set of hardware logic structures (e.g., filters, arithmetic logic units, and dedicated state machines). The controller may be configured to perform audio signal processing operations and/or networking operations. For instance, the controller 30 may be configured stream audio content (e.g., as one or more audio signals) from the media content server 15 for playback through the speaker 19 and/or through the audio output device 13, and may be configured to perform audio signal processing operations upon one or more of the audio signals. For instance, the controller 30 may be configured to perform loudness compensation operations by generating and applying one or more EQ filters to maintain tonal balance of audio signals at different playback levels in order to provide listeners with a consistent and optimal listening experience, as described herein. More about the loudness compensation operations is described herein.

In one aspect, the playback device 12 (and/or the audio output device 13) may be arranged to have one or more sensors, such as the microphone 29 and the camera 28, that are designed to detect the environment (e.g., in which the playback device is located) and produce sensor data based on the environment. For instance, the camera 28 may be a complementary metal-oxide-semiconductor (CMOS) image sensor that is capable of capturing digital images including image data that represent a field of view of the camera 28, where the field of view includes a scene of an environment in which the device 12 is located. In some aspects, the camera may be a charged-coupled device (CCD) camera type. The camera may be configured to capture still digital images and/or video that is represented by a series of digital images. In one aspect, the camera may be positioned anywhere about/on the device. In some aspects, the device may include multiple cameras (e.g., where each camera may have a different field of view).

The microphone 29 may be any type of microphone (e.g., a differential pressure gradient micro-electro-mechanical system (MEMS) microphone) that is configured to convert acoustical energy caused by sound wave propagating in an acoustic environment into an input microphone signal. In some aspects, the microphone may be an "external" (or reference) microphone that is arranged to capture (e.g., ambient) sound from the acoustic environment. In another aspect, the microphone may be an "internal" (or error) microphone that is arranged to capture sound (and/or sense pressure changes) inside a user's ear (or ear canal).

In one aspect, the playback device 12 may have one or more other sensors, such as an inertial measurement unit (IMU) that may be configured to produce motion data that indicates the position and/or orientation of the device. In one aspect, the playback device may include (e.g., optical) proximity sensors that are designed to produce sensor data that indicates an object is at a particular distance from the sensor (and/or the device).

In one aspect, the sensors of the playback device 12 may be a part of (or integrated into) the device. In another aspect, sensors may be separate electronic devices that are communicatively coupled with the (e.g., controller 30 of the) playback device, via the network interface 17.

The speaker 19 may be an electrodynamic driver that may be specifically designed for sound output at certain frequency bands, such as a woofer, tweeter, or midrange driver, for example. In one aspect, the speaker 19 may be a "full-range" (or "full-band") electrodynamic driver that reproduces as much of an audible frequency range as possible.

The display 18 is designed to present (or display) digital images or videos of video (or image) data. In one aspect, the display screen may use liquid crystal display (LCD) technology, light emitting polymer display (LPD) technology, or light emitting diode (LED) technology, although other display technologies may be used in other aspects. In some aspects, the display may be a touch-sensitive display screen that is configured to sense user input as input signals, which may be provided to the controller 30 in order to cause the controller to perform one or more operations. In some aspects, the display may use any touch sensing technologies, including but not limited to capacitive, resistive, infrared, and surface acoustic wave technologies.

The volume control 16 is configured to define a volume setting that is associated with a volume (playback output) level of sound output of the (e.g., playback device of the) audio system. Specifically, the volume control may be arranged to adjust a volume setting responsive to receiving a user-adjustment (e.g., user input) at the control. In one aspect, the volume control may be a "master" volume control that may be configured to control the overall volume level (e.g., sound output level of the speaker 19) of the playback device 12 (and/or the sound level of the speaker 22 of the audio output device 13). In one aspect, the volume control may be a "hardware" volume control that may be a dedicated volume input control, such as one or more buttons, a rotatable knob, or a physical slider. In one aspect, the control may set (or adjust) volume settings for one or more hardware components, such as a digital-to-analog converter (DAC) or an amplifier (AMP), (not shown) of the playback device. For example, adjustments to the volume control 16 may increase or decrease the gain applied by the AMP to one or more audio signals. In one aspect, the hardware volume control 16 may adjust volume digitally, by applying one or more gains to one or more audio signals of audio content that is being played back by the playback device.

In some aspects, the volume control may be any type of physical input device that can adjust the overall volume level. In one aspect, the volume control may be a single volume control that includes several volume settings (or positions), where each setting defines a different loudness level (e.g., a different sound output level (e.g., dB SPL)) of the playback device. In particular, the volume control may (e.g., in response to a user-adjustment) incrementally increase or decrease the sound output level of audio content based on a user adjusting the control's volume setting or position, where the adjusted sound output level results in changes in the listener's perceived loudness of the audio content. For example, when the volume control is a rotatable volume knob, the control may have several volume settings, such as 18 settings, where each successive volume setting may correspond to a degree of rotation and may increase the overall volume by one or more particular gain values. In this case, each volume setting may correspond to a 20° rotation about a center axis. For instance, a first volume setting may be 0°, where the overall volume is muted, a second volume setting may be 20° (e.g., where the overall volume increases by a particular gain value), and so on. Thus, the knob produces a control signal that either incrementally increases or decreases the volume based on how much the knob is twisted and in what direction (e.g., turning clockwise increases the volume, whereas turning counterclockwise decreases the volume). In one aspect, the volume control may be a master volume control that is configured to provide bi-directional control for either incrementally increasing or decreasing an overall level of (e.g., sound output of) the device. In one aspect, the control may be a part of the playback device (e.g., integrated on the device). In another aspect, the volume control may be a part of an electronic device that is communicatively coupled with the playback device.

In another aspect, the volume control 16 may be a "software" volume control. In one aspect, the volume control may be a software volume control such that a software application (e.g., a media player application) that may be executing on the source device performs one or more digital signal processing operations to modify one or more digital audio signals associated with audio content. In some aspects, adjustments to the control may result in one or more gains being applied to the digital audio signal.

In one aspect, the volume control 16 may be a user interface (UI) item that is displayed on (e.g., a graphical user interface (GUI) within) the display 18. For example, the volume control may be a slider that may be translated along a predefined slidable range. When user input is received to adjust (or translate) the position of the slider (e.g., by the user touching the slider on the display and dragging it in one or more directions), the volume control adjusts the overall playback output level based on the position of the slider. In one aspect, similar to the example of the physical control, the UI item may include several volume settings, where each position of the slider may correspond to a different playback output level for the device. In this case, since the slider has a pre-defined slidable range, or a slidable distance from one side, each volume setting may correspond to a distance along the slidable range. In another aspect, the volume settings may correspond to a percentage (e.g., from 0 to 100 percent) that may correspond to the slider's distance from a starting position along the slidable range. In another aspect, the volume control may include several volume settings as numerical values (e.g., 1-10), where the volume settings may be changed by a user-adjustment to the volume control (e.g., selecting, dragging, twisting, etc.).

In some aspects, the volume control 16 may be any input by a user of the device. For example, the input may include a gesture (e.g., a hand gesture, a finger gesture, a head gesture, etc.) made by the user and detected by the device (e.g., by an IMU of the device that is caused by the hand gesture). In another aspect, the volume control may be a voice command that is received via the microphone 29.

As described thus far, the volume control 16 may be configured to adjust the loudness level of audio content (as perceived by one or more listeners) that is being played back by the playback device. In another aspect, the volume control may also define the playback output level for the audio output device 13, when the audio output device is communicatively coupled with the playback device and is configured to playback audio content through speaker 22.

The audio output device 13 includes a controller 20, a network interface 21, a speaker 22, a microphone 23, and a (e.g., optional) volume control 26. In one aspect, the device may include more or less elements. For example, the output device 13 may include multiple microphones and/or speakers. In another aspect, the audio output device may include an accelerometer (not shown) that is arranged and configured to receive (detect or sense) speech vibrations that are produced while a user (e.g., who may be wearing the output device) is speaking, and produce an accelerometer signal that represents (or contains) the speech vibrations. Specifically, the accelerometer is configured to sense bone conduction vibrations that are transmitted from the vocal cords of the user to the user's ear (ear canal), while speaking and/or humming. For example, when the audio output device is a wireless headset, the accelerometer may be positioned anywhere on or within the headphone, which may touch a portion of the user's body in order to sense vibrations. In some aspects, the output device 13 may include one or more internal and/or external microphones, as described herein. In the case of an in-ear headphone, the internal microphone may sense inside the user's ear when the headphone is positioned on (or in) the user's ear.

In one aspect, controller 20 is configured to perform audio signal processing operations and/or networking operations, as described herein. For instance, the controller may be configured to obtain (or receive) an audio data (as an analog or digital audio signal) of media content or user-desired media content (e.g., music, etc.) for playback through the speaker 22. In some aspects, the controller may obtain audio data from local memory, or the controller may obtain audio data from the network interface 21, which may obtain the data from an external source such as the playback device 12 (via its network interface 17). For instance, the output device 13 may stream an audio signal from the playback device (e.g., via the BLUETOOTH connection) for playback through the speaker 22. The audio signal may be a signal input audio channel (e.g., mono). In another aspect, the controller may obtain two or more input audio channel (e.g., stereo) for output through two or more speakers. In one aspect, in the case in which the output device includes two or more speakers, the controller may perform additional audio signal processing operations. For instance, the controller may spatially render the input audio channels (e.g., by applying spatial filters, such as head related transfer functions (HRTFs)) to produce binaural output audio signals for driving at least two speakers (e.g., a left speaker and a right speaker). In another aspect, spatial rendering may be performed by the playback device. In which case, the audio output device may receive the binaural output audio signals from the playback device.

In one aspect, the volume control 26 may perform similar operations as the control 16 of the playback device. For instance, upon receiving user input, the control 26 may adjust the (e.g., overall) volume of sound output by the (e.g., speaker 22 of the) audio output device. In some aspects, the volume control 26 may be used to adjust the volume at the playback device 12. In which case, upon receiving user input, the audio output device may transmit a control signal indicating a user-adjustment of the volume control to the playback device, which may use the signal to adjust the volume of one or more audio signals. More about adjusting the volume is described herein.

In one aspect, either (or both) of the (e.g., controllers of the) devices 12 and 13 may be configured to perform (e.g., additional) audio signal processing operations based on elements that are coupled to the controller. For instance, when the playback device includes two or more "extra-aural" speakers, which are arranged to output sound into the acoustic environment rather than speakers that are arranged to output sound into a user's ear (e.g., as speakers of an in-ear headphone), the controller may include a sound-output beamformer that is configured to produce speaker driver signals which when driving the two or more speakers produce spatially selective sound output. Thus, when used to drive the speakers, the playback device may produce direc-tional beam patterns that may be directed to locations within the environment.

In some aspects, the controller 30 (and/or controller 20) may include a sound-pickup beamformer that can be con-figured to process the audio (or microphone) signals pro-duced two or more external microphones of the output device to form directional beam patterns (as one or more audio signals) for spatially selective sound pickup in certain directions, so as to be more sensitive to one or more sound source locations. In some aspects, the controller may per-form audio processing operations upon the audio signals that contain the directional beam patterns (e.g., perform spec-trally shaping).

In another aspect, the controller(s) may perform one or more functions. For example, the controller 20 may be configured to perform an active noise cancellation (ANC) function to cause the speaker 22 to produce anti-noise in order to reduce ambient noise from the environment that is leaking into the user's ears. The ANC function may be implemented as one of a feedforward ANC, a feedback ANC, or a combination thereof. As a result, the controller may receive a reference microphone signal from a micro-phone that captures external ambient sound, such as micro-phone 23. In another aspect, the controller may perform any ANC method to produce the anti-noise. In another aspect, the controller 20 may perform a transparency function in which sound played back by the device is a reproduction of the ambient sound that is captured by the device's external microphone in a "transparent" manner, e.g., as if the head-phone was not being worn by the user. The controller processes at least one microphone signal captured by at least one external microphone 23 and filters the signal through a transparency filter, which may reduce acoustic occlusion due the audio output device being on, in, or over the user's ear, while also preserving the spatial filtering effect of the wear's anatomical features (e.g., head, pinna, shoulder, etc.). The filter also helps preserve the timbre and spatial cues asso-ciated with the actual ambient sound. In one aspect, the filter of the transparency function may be user specific according to specific measurements of the user's head. For instance, the controller may determine the transparency filter accord-ing to a head-related transfer function (HRTF) or, equiva-lently, head-related impulse response (HRIR) that is based on the user's anthropometrics.

In one aspect, the (e.g., controller 30 of the) playback device 12 may perform (or control) at least some of the functions of the (e.g., controller 20 of the) audio output device 13 (and/or vice a versa). For instance, the controller 30 may perform the ANC function, whereby the anti-noise signal is produced from a reference microphone signal (e.g., from the audio output device and/or the playback device). When produced, the playback device may transmit the anti-noise signal to the audio output device for audio play-back via the speaker 22.

As described thus far, each of the devices may include one or more elements, such as one or more microphones and/or one or more speakers. In another aspect, at least some of these elements are optional, such as either (or both) of the devices including a volume control. In which case, the devices may not include a dedicated volume control, such as having a physical volume control. Instead, the devices may have a digital volume control, such as being a UI item displayed on a display (such as display 18). In another aspect, either of the devices may include additional ele-ments, such as the audio output device including an accel-erometer, as described herein.

As described herein, both the playback device 12 and audio output device 13 are configured to establish a wireless audio connection (e.g., BLUETOOTH connection) in order to exchange audio data. Thus, audio data and/or control signals may be exchanged between both devices via the wireless connection.

In one aspect, operations performed by the controllers may be implemented in software (e.g., as instructions stored in memory and executed by either controller) and/or may be implemented by hardware logic structures as described herein.

In another aspect, at least some of the operations per-formed by the audio system 10 as described herein may be performed by the playback device 12 and/or by the audio output device 13. As described herein, the playback device may perform loudness compensation operations. As another example, the audio output device may perform at least some loudness compensation operations. In another aspect, at least some of the operations may be performed by a remote server that is communicatively coupled with either device, for example over the network (e.g., Internet).

In one aspect, at least some elements of the playback device 12 and/or the audio output device 13 may be inte-grated (or a part of) each the respective device. For example, when the audio output device is on-ear headphones, the microphone and speaker may be a part of at least one earcup of the headphones that is placed on a user's ear. In another aspect, at least some of the elements may be separate electronic devices that are communicatively coupled to the device. For instance, the display screen 18 may be a separate device (e.g., being a display monitor or television) that is communicatively coupled (e.g., wired or wirelessly con-nected) with the playback device to receive image data for display. As another example, the camera 28 may be a part of a separate electronic device (e.g., a webcam) that is coupled to the playback device to provide captured image data.

Figure 3:
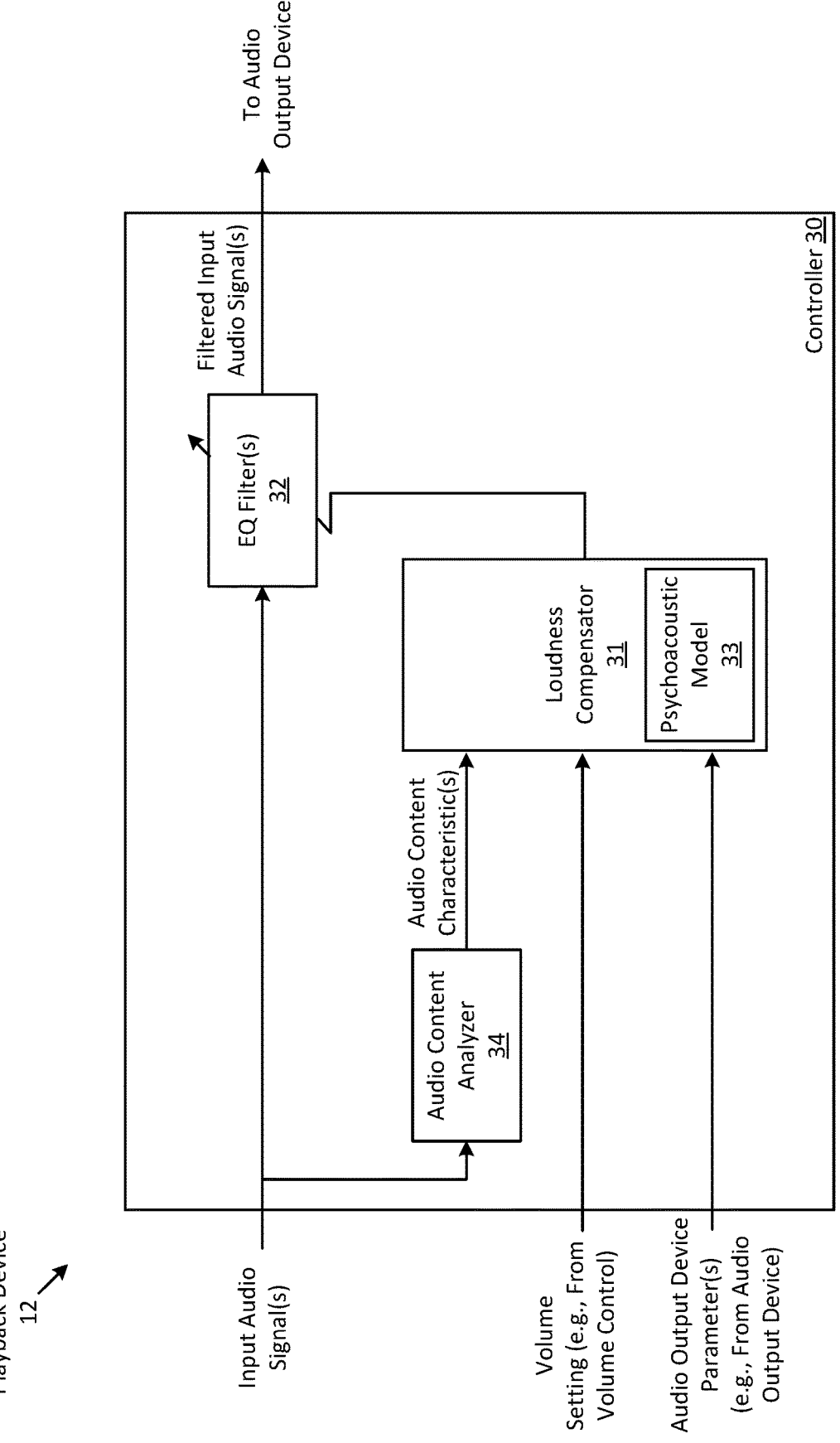
FIG. 3 shows a block diagram of the playback device that may be configured to perform loudness compensation according to one aspect.

FIG. 3 shows a block diagram of the playback device 12 that performs loudness compensation according to one aspect. Specifically, the playback device 12 may perform at least some of these operations during audio content play-back. For example, the operations described herein may be performed while audio content is played back (e.g., streamed from the media content server) through speaker 22 of the audio output device 13. This figure shows that the controller 30 has several operational blocks for performing loudness compensation. As shown, the controller includes an audio content analyzer 34, a loudness compensator 31, and one or more EQ filters 32. In one aspect, the controller may have more or less operational blocks. For example, the controller may include one or more audio digital signal processing blocks that are arranged to perform one or more audio signal processing operations upon one or more input audio signals, such as having a (e.g., scalar) gain block for applying a scalar gain to one or more input audio signals, a dynamic range compressor for compressing (at least a portion of) an audio signal, etc.

The audio content analyzer 34 may be configured to receive one or more input audio signals that includes audio content (e.g., a musical composition, a sound track, etc.) for playback. For instance, the input audio signals may include user-desired audio content, which a user of the playback device wishes to hear. In which case, the content may be user-selected content that is streamed from (e.g., through an on-line media content streaming service of) the media content server 15, as described herein. In another aspect, the input audio signals may include system audio content of the audio system 10. In another aspect, the audio signals may include audio data of a virtual personal assistant (VPA) application, which may be executed by the system 10.

In one aspect, the audio content analyzer 34 may be configured to determine one or more characteristics of the audio content of one or more input audio signals. Specifically, characteristics may include an identification or description of certain aspects of the audio content. For example, in the case of a musical composition, the characteristics may include a description of the composition, such as a genre (e.g., whether heavy metal, rock, blues, jazz, classical), a composer (or artist) name of the composition, a writer, a title, a duration, etc. In one aspect, the characteristics may indicate the type of spectral content that is associated with the audio signals. For instance, heavy metal music may have a significant amount of low-frequency content, whereas classical music may have less low-frequency content and/or have more high-frequency content than heavy metal. With a sound track of a motion picture, characteristics may include a genre, a title, etc. of the motion picture to which the movie sound track is associated. In another aspect, the audio content analyzer may determine other characteristics, such as an audio (or volume) level of the audio signal (e.g., decibels relative to full scale (dBFS), which may be an audio level at which the audio content of the audio signal was mastered (produced). In some aspects, differences in audio levels between audio signals may be based on the audio content provider (e.g., based on an on-line media content service provider) from which the audio content is being streamed.

In one aspect, the audio content analyzer 34 may determine the one or more characteristics based on metadata associated with the audio content (e.g., that is received and a part of the one or more input audio signals). In which case, the metadata may indicate at least some of the characteristics described herein. In another aspect, the metadata may be received separately from the input audio signals. For instance, when the audio content is streamed from the media content server 15, which may be associated with an on-line media content provider, the provider may transmit at least some metadata associated with the audio content. In some aspects, the analyzer may determine characteristics by performing a spectral analysis upon one or more of the input audio signals. In some aspects, the spectral analysis may determine spectral content (e.g., energy distribution across a frequency range) associated with the audio content. In some aspects, the spectral analysis may indicate a type of genre of the audio content, for example upon determining that a majority of the energy distribution (e.g., above a threshold) is within a low-frequency range, the analyzer may determine that the audio content is heavy metal. In one aspect, the analyzer may perform a table lookup into a data structure using at least a portion of the analyzed spectral content, where the data structure may associate one or more characteristics of audio content, such as genre, with spectral content. In some aspects, the spectral content may be wideband spectral content that extends across one or more frequency bands. For example, the spectral content of the audio signals may extend through an audible frequency range (e.g., from 20 Hz to 20,000 Hz), rather than extending through one frequency (e.g., which may be the case with an audio signal having a pure tone audio).

The loudness compensator 31 may be configured to receive the audio content characteristic(s) from the analyzer 34, a volume setting (e.g., from the volume control 16 of the playback device 12 and/or from the volume control 26 of the audio output device 13), and/or audio output device parameters (e.g., from the audio output device 13). In one aspect, the volume setting may be a current volume setting (e.g., a value of a range of volume setting values) of the volume control 16. In some aspects, the volume setting may be an adjusted volume setting in response to the volume control receiving user input (e.g., in response to the user twisting a volume knob of the audio system). As described herein, the volume setting may be received from either (or both) volume controls of the playback device and the audio output device. In another aspect, the volume setting may be based on an automatic (or adaptive) volume control adjustment, where the volume control is changed automatically (e.g., without user interference). For example, the audio system may be configured to adjust the volume control based on the acoustic environment. In particular, the audio system may observe noise within the acoustic environment (e.g., based on sounds captured by the microphone 29 of the playback device), and may adjust the volume setting automatically based on the noise (e.g., adjusting the volume setting based on whether a noise level within the acoustic environment is above (or below) a noise threshold).

In one aspect, the audio output device parameters may be received from the audio output device (e.g., via a wireless communication link between the playback device and the audio output device), and may identify characteristics of the audio output device. For example, the parameters may include a type of audio output device (e.g., whether the output device is an in-ear headset or an on-ear headset), a model of the audio output device (e.g., a specific model manufactured by a particular manufacturer), a manufacturer of the audio output device, and physical characteristics of the output device, for example in the case of in-ear headphones the parameters may indicate whether the headphones have an eartip. In another aspect, the parameters may indicate specifications of the audio output device, for example when the audio output device is an in-ear headphone, the parameters may indicate a sensitivity of the headphones, a frequency response of the headphones, an impedance of (e.g., speakers of the) headphones, etc.

In another aspect, the parameters of the audio output device (the volume setting and/or the input audio signal) may be received from (e.g., local or remote) memory. For example, the parameters may be retrieved from local memory of the playback device 12, where the playback device may have previously received at least some of the parameters from the audio output device. For instance, when the audio output device is wirelessly communicatively coupled with the playback device, the parameters may have been received when the wireless communication link was established between the devices (e.g., during a pairing process). In another aspect, the memory (e.g., of the controller 30 of the) playback device 12 may store at least some parameters, where the controller 30 may receive or determine identification information of the audio output device 13, and may use the information to perform a table lookup to retrieve the stored parameters associated with the information.

The loudness compensator 31 may be configured to generate (or produce) one or more EQ filters based on at least some of the received data for compensating for changes in tonal balance of (e.g., sound produced using) the input audio signal due to (e.g., changes in) volume settings of the audio system. Specifically, to generate the EQ filters, the compensator may use a psychoacoustic model 33, which is a perception model of how a (e.g., average) listener's auditory system takes sound input and translates that into a sensation (e.g., how the listener perceives sound). In one aspect, the model may be a model that is predefined in a controlled environment (e.g., in a laboratory). In another aspect, the model may be a learned model (e.g., through the use of a machine learning (ML) algorithm), which produces the model based on one or more inputs. For example, inputs may be based on learned listener behavior of a user of the playback device 12. For instance, behavior may include whether the listener increases or decreases the volume based on the audio content that is being played back, whether the user manually changes (or tunes) one or more EQ parameters (e.g., bass, etc.), etc.

In one aspect, to generate the EQ filter(s), the compensator 31 may use the psychoacoustic model that has one or more input(s) based on at least one of 1) one or more audio content characteristics, 2) the (current or adjusted) volume setting, and 3) one or more audio output device parameters (e.g., when the audio output device is a headset, the parameter may include the model of the parameter). In one aspect, the generated EQ filters may be a digital audio filter that is designed to spectrally shape (at least a portion of) an audio signal. For example, the EQ filter(s) may include a low-shelving filter that is designed to boost (or attenuate) low-frequency content and/or a high-shelving filter that is designed to boost (or attenuate) low-frequency content. In which case, the compensator may generate a (e.g., first) EQ filter with a first filter response (e.g., frequency response) that includes one or more gains to be applied across a (first) frequency range, and may generate a (e.g., second) EQ filter with a second frequency response that includes one or more gains to be applied across a (second) frequency range that is higher than the first frequency range. In another aspect, the EQ filter(s) may be any type of EQ filter, such as a low-pass filter, a high-pass filter, a band-pass filter, etc.

In one aspect, the loudness compensator 31 may generate one or more EQ filters for at least some volume settings of the audio system 10. As described herein, each volume setting of the (e.g., playback device of the) audio system may be associated with a particular playback output level, where, as the volume setting increases (e.g., up to a volume setting threshold, which may be a particular volume setting of the volume control (e.g., being a volume setting within a range of volume settings of the control)), the output level of sound playback by (e.g., at or near the speaker 19 of) the playback device 12 increases (e.g., as perceived by the listener). As also described herein, the loudness compensator 31 may be generating the EQ filters to be applied to input audio signals such that sound produced at different output levels maintains a tonal balance in order to provide a listener with a consistent listening experience. In one aspect, this tonal balance may be with respect to a reference (or bassline) playback level of the input audio signal that may be associated with a volume setting threshold (e.g., when the volume control is set to the volume setting threshold, the audio system may playback audio content at the reference playback level). In one aspect, the reference level may be a predefined level that may be associated with the (e.g., audio content of the) input audio signal, or may be a level that may be associated with one or more types of audio content. In some aspects, the reference level may be a particular playback output level (e.g., by one or more speakers), such as 85 dB SPL. For example, the playback output level may be a sound level at or near one or more speakers that are playing back the audio content. In one aspect, this reference playback level is a level at which the audio content of the input audio signal is calibrated (e.g., during production) to provide the most optimal listening experience. As a result, the loudness compensator may generate one or more EQ filters for at least some volume settings that are below (and/or above) the volume setting threshold. In some aspects, when the volume setting is defined as the volume setting threshold, the loudness compensator may not generate EQ filters for that volume setting since when the input audio signals are played back at that setting threshold, the loudness and tonal balance is the most optimal. More about EQ filters being generated for one or more volume settings is described herein.

With the one or more EQ filters generated, the loudness compensator 31 may be configured to select one or more of the generated EQ filters based on the received volume setting. As described herein, the compensator may generate one or more EQ filters for (and be associated with) at least some of volume settings of the audio system. Thus, the compensator may select the EQ filters associated with the received volume setting.

As described herein, the loudness compensator 31 may generate one or more EQ filters. In one aspect, the compensator may generate characteristics of EQ filters. For example, the compensator may produce digital filter coefficients of one or more EQ filters (e.g., based on the psychoacoustic model). In another aspect, the compensator may produce other characteristics, such as one or more gain values (e.g., scalar and/or vector gains), a cutoff frequency, a frequency response, etc. In another aspect, the loudness compensator may generate other audio signal processing characteristics, such as one or more scalar gain values that are to be applied (e.g., by the controller 30 of the playback device 12) to one or more input audio signals.

The EQ filter(s) 32 may be configured to receive the generated filter(s) from the loudness compensator 31. In one aspect, the EQ filter(s) may receive the generated filters and/or may receive characteristics of filters, such as one or more filter coefficients. From the characteristics, the controller 30 may be configured to generate the EQ filter(s) 32. The EQ filter(s) 32 receive the input audio signal(s) and produce one or more filtered input audio signal(s) by filtering the input audio signals with the EQ filters.

In one aspect, the controller 30 may be configured to (e.g., cause the playback device 12 to) transmit the filtered input audio signals to the audio output device 13 in order for the device to playback the filtered signals (e.g., by driving one or more speakers 22 with the filtered input audio signals). In another aspect, the controller 30 may use (at least some of the filtered input audio signals) to drive one or more speakers 19 of the playback device, rather than (or in addition to) transmitting the signals to the audio output device.

As described herein, the loudness compensator 31 may generate the EQ filters using the psychoacoustic model 33. In another aspect, the loudness compensator may determine one or more EQ filters by performing a table lookup into a data structure that associates one or more inputs into the loudness compensator (e.g., the audio output device parameters, etc.) with one or more EQ filters. For instance, upon matching associated inputs of the data structure with one or more received inputs, the compensator may select EQ filter(s) associated with the matching inputs. In which case, the controller may store (in memory) the EQ filters, which may have been previously generated (e.g., in a controlled environment) using the psychoacoustic model 33.

Figure 4:
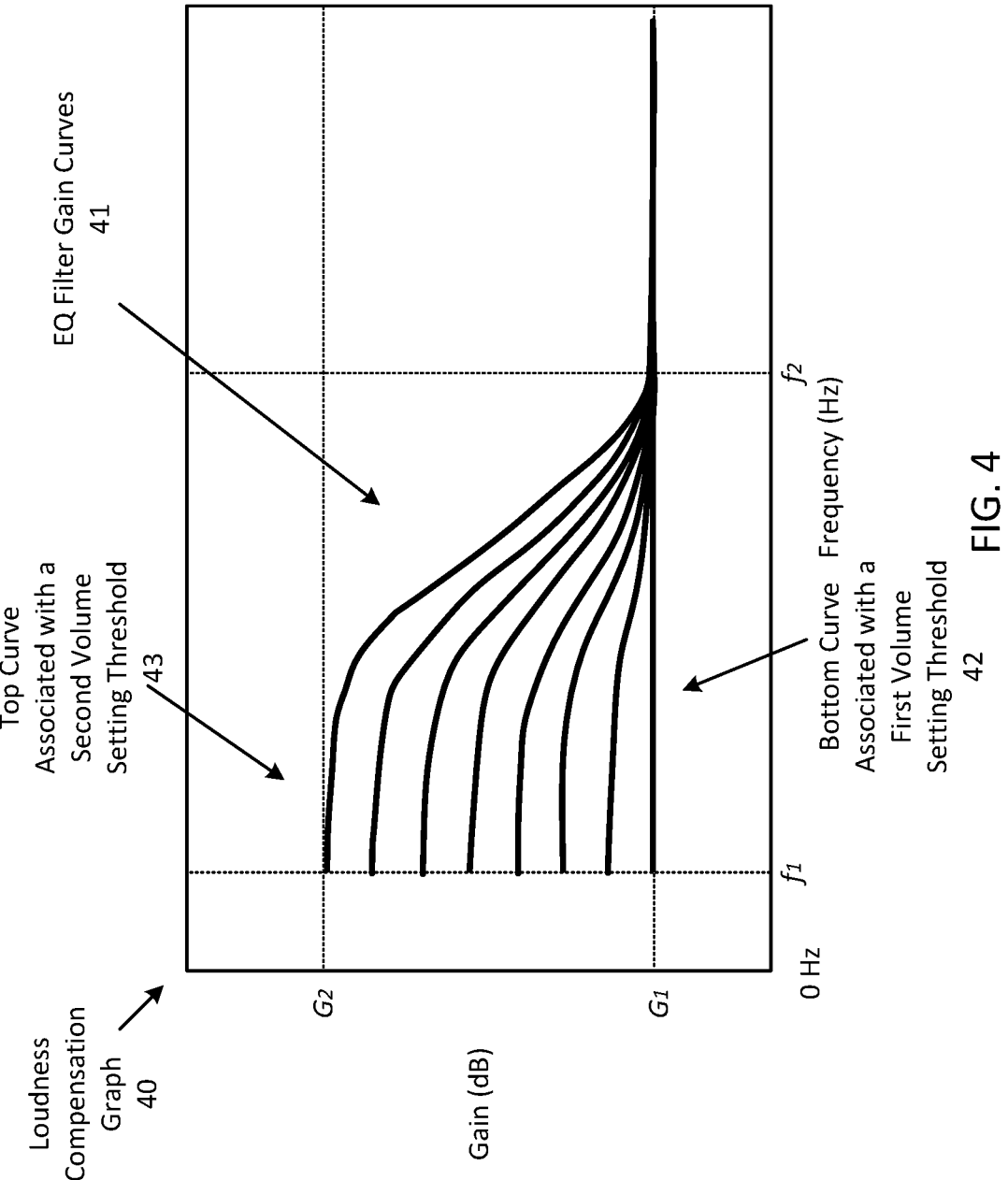
FIGS. 4 and 5 show loudness compensation graphs according to some aspects.
Figure 5:
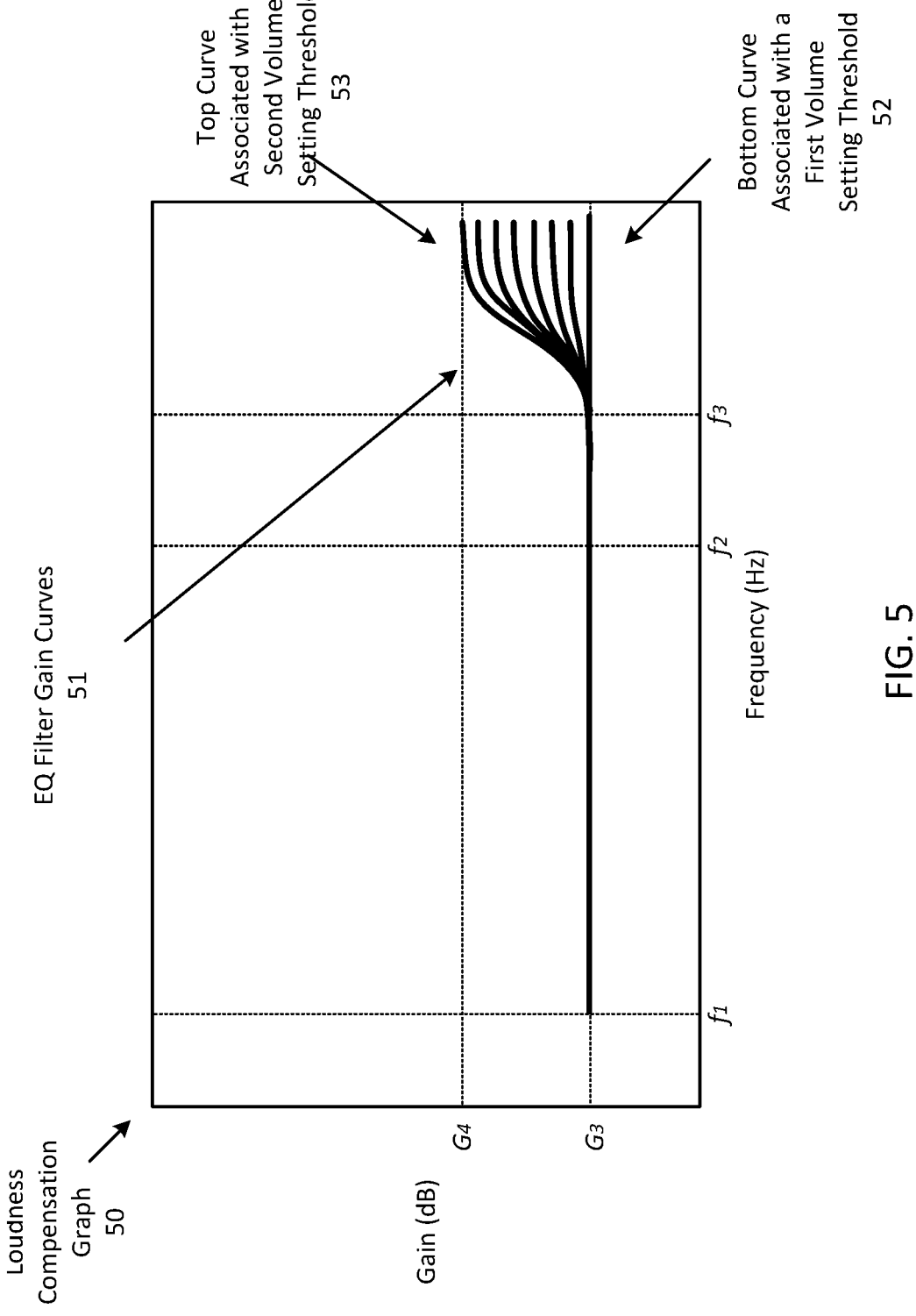

FIGS. 4 and 5 show loudness compensation graphs according to some aspects. Specifically, each of the graphs include gain curves of one or more generated EQ filters with respect to frequency and associated with one or more volume settings. In particular, FIG. 4 is showing a loudness compensation graph 40, which illustrates several EQ filter gain curves 41 for one or more EQ filters. For instance, each curve may be associated with one or more volume settings of the audio system 10. Specifically, each of the curves show (e.g., a frequency response that indicates how) one or more gains of an EQ filter as a function of (e.g., with respect to) frequency for one or more volume settings. In one aspect, each of the curves represents a (e.g., first order) low-shelving filter for low-frequency (e.g., bass) compensation. In one aspect, each of the curves includes one or more gains (e.g., which may be applied to one or more signals) across a (e.g., low) frequency range, from (e.g., at least and including) $f_1$ to $f_2$. In one aspect, the range may extend at least a portion of an audible frequency. For example, $f_1$ may be 20 Hz and $f_2$ may be between 100-400 Hz. In some aspects, $f_2$ may be approximately (or equal to) 200 Hz.

In one aspect, each of the curves represent an EQ filter that may be applied to one or more input audio signals with respect to a volume setting of a volume control (e.g., control 16 of the playback device) of the audio system 10. As shown, there are eight curves, each curve associated with one or more volume settings, where a top curve and a bottom curve may each be associated with one or more volume setting thresholds of the volume control 16. In one aspect, the curves 41 may have more or less curves as illustrated in this figure. In particular, the bottom curve 42 may be a flat (or approximately flat) gain curve (having a gain) at or around a first gain threshold, $G_1$, that may be associated with a first volume setting threshold. The top curve 43 may be a curve that has (or at least partially has) a gain (e.g., at or around) a second gain threshold, $G_2$, that may be associated with a second volume setting threshold. In some aspects, the first volume setting threshold may be greater than the second volume setting threshold. In one aspect, $G_1$ may be a gain at or around 0 dB, such that when the volume setting of the volume control is set to the first volume setting threshold, the EQ filter that may be applied to one or more input audio signals may be an all-pass filter that provides little to no gain across the frequency range. In one aspect, when the volume control is set to the first volume setting threshold, the loudness compensator may be configured to not apply (or stop applying) an EQ filter to the input audio signal. In which case, the controller 30 may pass through the input audio signal for playback through one or more speakers, such as to transmit the signal to the audio output device for playback. In another aspect, the controller may perform other audio signal processing operations upon the input audio signal. In one aspect, the first volume setting threshold may be a volume setting at which the input audio signal is to be played back at the reference level of the audio content, and as a result, little to no loudness compensation is required since the audio content is being (or to be) played back at a playback output level with an optimal tonal balance.

In one embodiment, each of the curves 41 above the bottom curve 42 may be associated with a volume setting that is less than the first volume setting threshold of the bottom curve 42. In some aspects, one or more EQ curves may be associated with one or more volume settings, where when the volume control is set to the one or more volume settings, the loudness compensator may generate (or use) a same (or similar) EQ filter to be applied to the input audio signal. Specifically, the eight volume settings of the eight illustrated curves may be a subset of a total number of volume settings of the audio system. For example, when the audio system has 20 volume settings, where 20 is the loudest (e.g., having a highest playback output level and a loudest perceived level by a user) and 1 is the quietest (e.g., where the audio system may be muted), the first volume setting threshold associated with the bottom curve 42 may be a volume setting of 12 out of 20, whereas the second volume setting threshold associated with the top curve 43 may be a volume setting of 5 out of 20. As a result, the loudness compensator may apply the EQ filter associated with the second volume setting threshold to the input audio signal between (and including) volume settings 1 and 5 out of 20. In one aspect, the loudness compensator may apply the same EQ filter to these volume settings since additional gain may provide little to no additional compensation due to the fact that the playback output level below the second volume setting threshold is so low. In addition, the loudness compensator may not apply an EQ filter (or may apply an all-pass filter) to one or more input audio signals between (and including) volume settings above (and including) the first volume setting threshold, which in this example may include volume settings 12 and 20. In one aspect, the first volume setting threshold may be associated with (or correspond to) the reference level of the audio content. In which case, for volume settings (equal to and/or above the threshold, the equalization for tonal balance may be attenuation types, e.g., at low (e.g., bass) and high (e.g., treble) frequencies, and in which case the attenuation may be so small (e.g., below a threshold), where the equalization may be a flat 0 dB (e.g., all-pass filter).

FIG. 5 shows a loudness compensation graph 50, which illustrates several EQ filter gain curves 51 for one or more EQ filters. Specifically, this graph 50 is showing gain curves of EQ filters that are associated with respective volume settings between (and including) volume setting thresholds. In one aspect, each of the curves represents a (e.g., second order) high-shelving filter for high-frequency (e.g., treble) compensation, where each of the curves includes one or more gains across one or more frequency (bins) within a (e.g., high) frequency range that extends from $f_3$. In one aspect, $f_3$ may be a high frequency between 5 kHz to 7 kHz. In some aspects, $f_3$ is (e.g., approximately) 6 kHz. In one aspect, high-frequency curves may be applied from along a high frequency range $f_3$ to an upper frequency limit of human ears or hearing (e.g., at or approximately 20 kHz).

This figure shows a bottom curve 52 as a flat gain curve at or around a third gain threshold, $G_3$, that may be associated with the first volume setting threshold, while the top curve 53 has a fourth gain threshold, $G_4$, and may be associated with the second volume setting threshold. In one aspect, at least some of the four gain thresholds for the low and high shelving filters shown in FIGS. 4 and 5 may be the same or different. For example, $G_1$ and $G_3$ may be the same (e.g., 0 dB), and/or $G_2$ and $G_4$ may be the same. In another aspect, $G_2$ and $G_4$ may be greater than $G_1$ and $G_3$, while $G_2$ may be greater than $G_4$. In one aspect, the first and second volume setting thresholds associated with the curves 52 and 53 may be the same (or different) than the first and second volume setting thresholds associated with curves 42 and 43, respectively.

In one embodiment, the high-frequency compensation EQ filters associated with the gain curves 51 may not (or at least partially) overlap with the high-frequency compensation EQ filters associated with the gain curves 41 of FIG. 4. In particular, EQ filters associated with the curves 41 have a frequency response that includes one or more gains across a first frequency range (e.g., between $f_1$ and $f_2$), whereas EQ filters associated with curves 51 have a frequency response that includes one or more gains across a second frequency range (e.g., above $f_3$). As described herein, the second frequency range may extend from $f_3$ to a highest audible frequency.

In one aspect, the loudness compensator may apply two or more EQ filters based on the volume setting of the audio system. Specifically, the loudness compensator may generate an EQ filter based on the low-frequency compensation curves 41 of FIG. 4 and an EQ filter based on the high-frequency compensation curves 51 of FIG. 5, based on the volume setting of the audio system. For example, when the volume control is set at the second volume setting threshold, the loudness compensator may generate a low-frequency compensation EQ filter based on (or having) the EQ filter gain curve 43 of curves 41 in FIG. 4, and may generate a high-frequency compensation EQ filter having the EQ filter gain curve 53 of curves 51 in FIG. 5. In another aspect, the loudness compensator may apply either or both low-frequency and high-frequency EQ filters in order to provide loudness compensation.

As described thus far, the loudness compensator may generate an all-pass filter to be applied to one or more input audio signals when the volume control is set to the first volume setting threshold, and may apply the all-pass filter to volume settings that are higher than the threshold. In another aspect, the loudness compensator may generate EQ filters that includes a gain curve that is configured to attenuate (e.g., having a gain lower than 0 dB) one or more input audio signals. For example, for each volume setting below the first volume setting threshold, the loudness compensator may generate one or more EQ filter that attenuates low-frequency (and/or high-frequency) audio content.

FIG. 6 is a flowchart of a process 60 for performing loudness compensation according to one aspect. In one aspect, at least some of the operations of the process may be performed by the (e.g., controller 30 of the playback device 12 of the) audio system 10. In another aspect, at least some of the operations may be performed by one or more other devices of the audio system. For example, at least some operations may be performed by the (e.g., controller 20 of the) audio output device 13. More about the audio output device performing the process 60 is described herein.

The process 60 begins with the controller 30 receiving an input audio signal comprising (e.g., user-desired) audio content (at block 61). In one aspect, the controller may receive the input audio signal in response to user input. For example, the playback device may receive (e.g., via an input device, such as a touch-sensitive display) user input indicating a request to playback audio content. This request may be through a graphical user interface (GUI) of a media playback software application that is executing on the playback device. In another aspect, the request may be provided to an on-line media content streaming service in order to stream the audio signal from one or more media content servers 5. In which case, the input audio signal may be received from a remote device. In another aspect, the input audio signal may be received (or retrieved) from local memory (e.g., memory of the playback device 12). In one aspect, the controller may receive a single (e.g., mono) audio signal. In another aspect, the controller may receive one or more input audio signals (e.g., two signals for a stereo recording) that include at least a portion of the audio content.

The controller 30 determines a characteristic of the audio content (at block 62). For example, when the audio content is a musical composition, the characteristic may indicate a genre of the composition. In one aspect, the characteristic may indicate a spectral content (e.g., distribution) of the audio content in the audio signal, such as indicating whether the audio content is primarily (e.g., above a threshold) low-frequency content. In another aspect, the characteristic may indicate an amount (e.g., percentage) of different spectral content within the audio signal. The controller determines a parameter of the audio output device 13 (at block 63). For example, the controller 30 may receive (or retrieve) characteristics and/or specifications of the audio output device, such as a model of the audio output device. The controller 30 receives a volume setting of a volume control (e.g., control 16) of the audio system 10 (at block 64). In particular, the controller may receive a current volume setting associated with the volume control. For example, when the volume control has a volume setting range of 0 to 20, the controller may determine a current volume setting of the control as 10, which may be associated with a playback level at which the audio output device (and/or playback device) is to playback the audio content. In another aspect, the volume setting may be received in response to user input of the volume control 16 (e.g., when the user manipulates the volume control to change the volume setting of the control to a new setting).

The controller 30 determines, using a psychoacoustic model (e.g., model 33) that has input based on at least one of the characteristic, the parameter, and the volume setting, one or more EQ filters (at block 65). For example, the loudness compensator may use at least a portion of these as inputs into the model 33, which may be configured to produce one or more EQ filters (and/or characteristics of filers, such as filter coefficients) based on the inputs. In another aspect, as described herein, the loudness compensator may use the model by performing a table lookup into a data structure that stores EQ filters generated by the model that are associated with one or more of the inputs. In one aspect, the controller may use the model 33 to determine a first EQ filter and a second EQ filter. For example, the first EQ filter may be (e.g., based on) a gain curve of curves 41 in FIG. 4, such that the filter may be for applying a first set of one or more gains across a first frequency range, and the second EQ filter may be (e.g., based on) a gain curve of curves 51 in FIG. 5, such that the filter may be for applying a second set of gains across a second, higher frequency range.

The controller produces a (or one or more) filtered input audio signal by applying one or more (generated) EQ filters to the input audio signal (at block 66). In particular, the EQ filter 32 may be defined by the loudness compensator (e.g., to apply the one or more generated EQ filters), and the EQ filter(s) may then be applied to the input audio signal.

The controller 30 transmits the filtered audio signal to the audio output device 13 for playback (at block 67). In another aspect, in addition to (or in lieu of) transmitting the signal to the audio output device, the controller 30 may use the filtered audio signal to drive the speaker 19 of the playback device 12 in order to playback the audio content. Thus, the sound produced by the speakers has a desired tonal balance perceived by a user of the audio output device, as described herein.

The controller 30 determines whether the volume setting has been adjusted (e.g., via a user-adjustment to the volume control) (at decision block 68). Specifically, the controller determines whether the current volume setting has changed (e.g., whether the volume setting has increased or decreased). For instance, the controller determines whether the volume control 16 (and/or control 26) receives user input (e.g., when the volume control is a knob, the controller determines whether a control signal has been received indicating that the knob has been twisted). In one aspect, the controller determines whether the volume setting has been adjusted through other types of input, such as whether a voice command has been detected indicating that the volume is to be adjusted (e.g., based on a voice recognition algorithm that is being executed by the controller that monitors one or more microphone signals for speech). In another aspect, an indication that the volume setting is to be adjusted may be performed automatically (e.g., without user intervention). For instance, the controller may monitor ambient noise, and determine whether the volume setting is to be adjusted based on a noise level e.g., whether the noise is above a threshold). If so, the controller may adjust the volume setting.

If an adjustment to the volume setting has been received, the controller may perform at least some operations at block 65 to produce one or more (different) EQ filters and produces a new filtered audio signal by applying the one or more different EQ filters. This new filtered signal may be transmitted to the audio output device and used to drive one or more speakers of the audio output device in order to produce sound of the filtered signal at a different playback output level, while the perceived tonal balance of the input audio signals (e.g., between different loudness levels) is maintained. In particular, the new filtered audio signal may have a same tonal balance as the previous filtered audio signal. In other words, sound produced at different playback output levels will continue to have a desired tonal balance (e.g., which may be associated with the reference playback level, as described herein). In which case, the different playback output levels may result in different loudness levels perceived by a listener, where the desired tonal balance may be maintained between the different loudness levels perceived by the listener.

In another aspect, the controller 30 may continue to use the previously determined EQ filter(s), even if the volume setting is (e.g., user) adjusted (e.g., via input to the volume control 16). As described herein, the loudness compensator may use the same (or similar) EQ filters for one or more volume settings. For example, the controller may receive an adjustment to the volume setting (e.g., by receiving an adjustment to the volume control 16), and may determine whether the current volume setting (e.g., prior to receiving the adjustment) was set to (or equal to) one of one or more volume setting thresholds (e.g., the first volume setting threshold and/or the second volume setting threshold in FIGS. 4 and 5). If so, the controller may determine whether the adjustment to the volume setting may result in applying the same EQ filter(s) as applied for the previous volume setting based on whether the adjustment is greater than or less than a particular volume setting threshold. For example, the previous volume setting may be the first volume setting threshold described in FIG. 4, where the threshold may be associated with a reference level of the audio content. As a result, when the volume setting is at that threshold, no EQ filter (or an all-pass filter) may be applied to the audio signal of the audio content. The controller may be configured to determine whether the adjustment to the volume setting is equal to or below the first volume setting threshold. Responsive to the adjustment to the volume setting being equal to the first volume setting threshold (e.g., the adjusted volume setting being 13 out of 20, whereas the first volume setting threshold may be 12 out of 20), the controller may continue to not apply an EQ filter (or may continue to use the all-pass filter). In one aspect, the controller may continue to produce the filtered audio signal by applying the same EQ filters as before the adjustment based on the current volume setting, and may continue to use the filtered audio signal to drive one or more speakers. In one aspect, the controller may use the (e.g., original) input audio signal to drive one or more speakers of the headset. For example, if the current volume setting is equal to the first volume setting and the volume setting adjustment is greater than the first volume setting threshold, the controller may (e.g., continue to) drive the speaker of the audio output device with the input audio signal (or a filtered input audio signal with one or more all-pass filters). Responsive, however, to the adjustment to the volume setting being less than the first volume threshold (e.g., going from a volume setting of 12 to 8), the controller may select a new EQ filter from several EQ filters according to the adjustment of the volume setting.

The above-mentioned example describes how no EQ filter, or an all-pass filter may be applied to an audio signal, responsive to an adjusted volume setting being equal to or greater than the first volume setting threshold. With respect to the second volume setting threshold described herein, which may be less than the first volume setting threshold, the audio system may apply a same (or similar) set of EQ filters. Returning to the previous example, when the second volume setting threshold is a volume setting of 5 out of 20 total volume settings of the audio system, the system may be configured to apply one or more EQ filters associated with the second volume setting threshold to one or more input audio signals when the volume setting of the audio system falls below the second volume setting threshold.

In one aspect, regardless of whether there is an applied EQ filter (or whether the EQ filter changes) based on the volume setting, the controller 30 may be configured to apply one or more gains to one or more input audio signals based on changes to the volume setting of the system.

As described herein, the controller 30 of the playback device 12 may perform at least some of the operations of process 60 to perform loudness compensation. In another aspect, the audio output device 13 may perform at least some of the operations. For example, the (e.g., controller 20 of the) audio output device may receive an input audio signal from the playback device, and may perform the process 60 to produce one or more filtered input audio signals and drive one or more speakers with the one or more filtered input audio signals.

In one aspect, the operations described herein may be performed automatically (e.g., without user intervention) in order to perform loudness compensation. Specifically, the audio system 10 may perform at least some of these operations such that the tonal balance of an audio signal is maintained, e.g., between different loudness levels and/or between different audio output devices in order to provide a listener with an optimal listening experience. In some aspects, the operations may be performed responsive to the varying criteria. For example, the controller 30 may perform loudness compensation upon determining that a new (or different) audio signal is being received (e.g., in response to a current musical composition ending and a new musical composition starting to be streamed by the playback device 12). As another example, the system 10 may perform loudness compensation in response to changes to the audio output device, such as the playback device being used by a different output device (e.g., the user switching from using wireless headphones to playback a musical composition to a smart speaker). As a result, the controller 30 may receive new audio output parameters, and may adjust loudness compensation accordingly (e.g., by applying the new parameters to the psychoacoustic model 33). In some aspects, the loudness compensation may be performed in response to a user adjustment to one or more user settings of the audio system. As a result, a user may turn on or off the loudness compensation (e.g., by selecting a UI item of a GUI that is displayed on display 18).

As described thus far, the (e.g., loudness compensator 31 of the) controller 30 may be configured to determine one or more EQ filters using a psychoacoustic model based on one or more inputs in order to compensate for different playback output levels. In one aspect, the controller may be configured to tune the generated one or more EQ filters. Tuning may be performed as follows. As described herein, the controller may be configured to generate one or more EQ filters based on the psychoacoustic model. In one aspect, the generated EQ filters may be modeled as several, infinite impulse response biquads coupled in cascade (series), where the generation of the filters may be performed by computing filter coefficients of each biquad. The controller may be configured to tune one or more EQ parameters associated with the generated EQ filters. As described herein, the EQ filters may include low-frequency compensation filters associated with curves 41 of FIG. 4 and/or high-frequency compensation filters associated with curves 51 of FIG. 5. In one aspect, gains and/or gain thresholds associated with the curves may be tunable EQ parameters. Specifically, gain thresholds associated with the EQ filters (e.g., thresholds described in FIGS. 4 and 5 may be tunable, such that one or more of (e.g., gain curves associated with) the generated EQ filters may be adjusted. For example, $G_1$ and $G_3$ of FIGS. 4 and 5, respectively, may be tunable within a first gain range. For example, the range may be between 0 dB and −12 dB. In another aspect, the gain thresholds may be tunable between 0 dB and −6 dB. In addition, $G_2$ may be tunable within a second gain range, while $G_4$ may be tunable within a third gain range. In one aspect, the second gain range may be greater than the third gain range. For example, the second gain range may extend between 0 dB and 40 dB. As another example, the second gain range may be between 0 dB and 20 dB. The third gain range, however, may be extend between 0 dB and 20 dB. As another example, the third gain range may extend between 0 dB and 10 dB. Thus, as a result, each of the (e.g., gain curves associated with the) EQ filters may be tunable within one or more of the gain ranges, which may result in more (or less) gain applied (across one or more frequency ranges), when the associated EQ filters are applied to input audio signals.

In one aspect, the controller 30 may tune one or more EQ parameters based on adjustments to one or more gain thresholds, $G_1$, $G_2$, $G_3$, and/or $G_4$. For example, the controller may determine (or retrieve) one or more default gain thresholds (which may be predetermined in a controlled environment, such as a laboratory). In one aspect, the default gain thresholds may be decided by using an average audio content spectrum as input into the psychoacoustic model 33. The controller 30 may be configured to determine whether the real-time audio content spectrum (e.g., the audio content for or being played back by the audio system 10) is different than the average audio content spectrum (e.g., based on a spectral analysis). If so, the controller 30 may be configured to tune one or more of the gain thresholds to account for one or more differences based on the comparison. In one aspect, upon adjusting one or more gain thresholds, the controller 30 may be configured to tune one or more biquad coefficients, which may then be used to adjust one or more EQ filters.

In one aspect, the controller 30 may tune one or more of the EQ parameters for one or more of the generated EQ filters. With the tuned EQ filters, the controller may be configured to select (e.g., one or more biquad coefficients associated with) a tuned EQ filter that is associated with a current (or adjusted) volume setting, as described herein. With the selected coefficients, the controller may filter the input audio signal, as described herein. In one aspect, the controller may tune the EQ parameters upon an adjustment of the volume control 16. In another aspect, the EQ parameters may be tuned periodically (e.g., every minute). As another example, the parameters may be tuned each time (or at least once) the audio content that is being played back changes (e.g., between different musical compositions).

Figure 7:
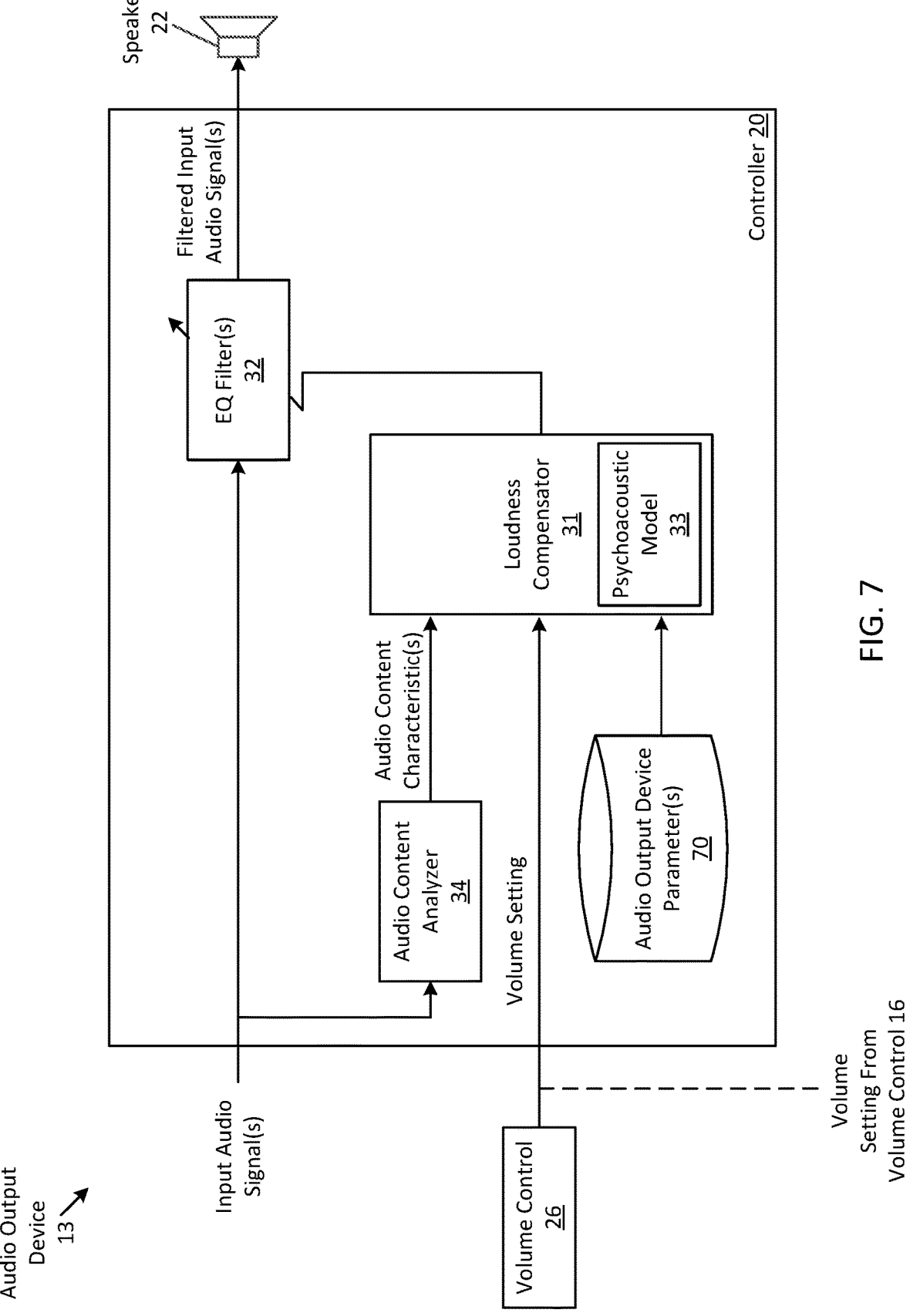
FIG. 7 shows a block diagram of the audio output device that may be configured to perform loudness compensation according to one aspect.

In one aspect, the audio output device (e.g., headset) 13 may perform at least some of the loudness compensation operations, as described herein. FIG. 7 shows a block diagram of the audio output device that may be configured to perform loudness compensation according to one aspect. In particular, this figure shows the volume control 26, the speaker 22, and the controller 20 of the audio output device, where the controller 20 includes at least some of the operational blocks of controller 30, described herein. For instance, the controller includes the audio content analyzer 34, the loudness compensator 31 that includes the psychoacoustic model 33, the EQ filter(s) 32. The controller 20 also includes one or more audio output device parameters(s) 70, which may be a data structure (or table) stored in memory (e.g., of the controller 20) of the headset 13.

As shown, the controller 20 receives one or more input audio signals that include audio content (e.g., user-desired audio content, such as a musical composition). In one aspect, the audio signals may be retrieved from local memory. In another aspect, the output device 13 may receive one or more of the signals from another device, such as the playback device 12. In which case, the output device may be communicatively coupled (e.g., via a wireless connection) with the playback device in order to exchange audio data.

In addition, the controller 20 may receive a volume setting from the volume control 26 of the audio output device 13. In another aspect, the volume setting may be received from the volume control 16 of the playback device 12. For example, a user of the playback device may adjust the (e.g., master) volume at the playback device (e.g., adjusting a volume control through a graphical user interface displayed on display 18), and in which case the playback device may transmit the user-adjusted volume setting to the audio output device.

As described herein, the controller 20 may perform the loudness compensation operations using one or more of the operational blocks described herein. For example, the audio content analyzer 34 may be configured to determine one or more audio characteristics based on one or more input audio signals. The controller 20 may be configured to determine one or more parameters of the audio output device using the parameter(s) data structure 70. In particular, the data structure 70 may store one or more parameters of the audio output device, as described herein. In which case, the controller 20 may retrieve one or more parameters stored in the structure 70. In another aspect, the controller 20 may determine one or more parameters of the audio output device 13 by retrieving one or more parameters from another source (e.g., a remote server).

As described herein, the loudness compensator 31 determines, using the model 33, one or more characteristics of the audio content, and/or one or more parameters of the audio output device, one or more EQ filters. The controller 20 produces one or more filtered audio signals by applying the one or more EQ filter(s) 32 (e.g., based on one or more filters) determined by the compensator 31 to one or more input audio signals. The controller 20 uses the filtered input audio signal(s) to drive the speaker 22.

Figure 8:
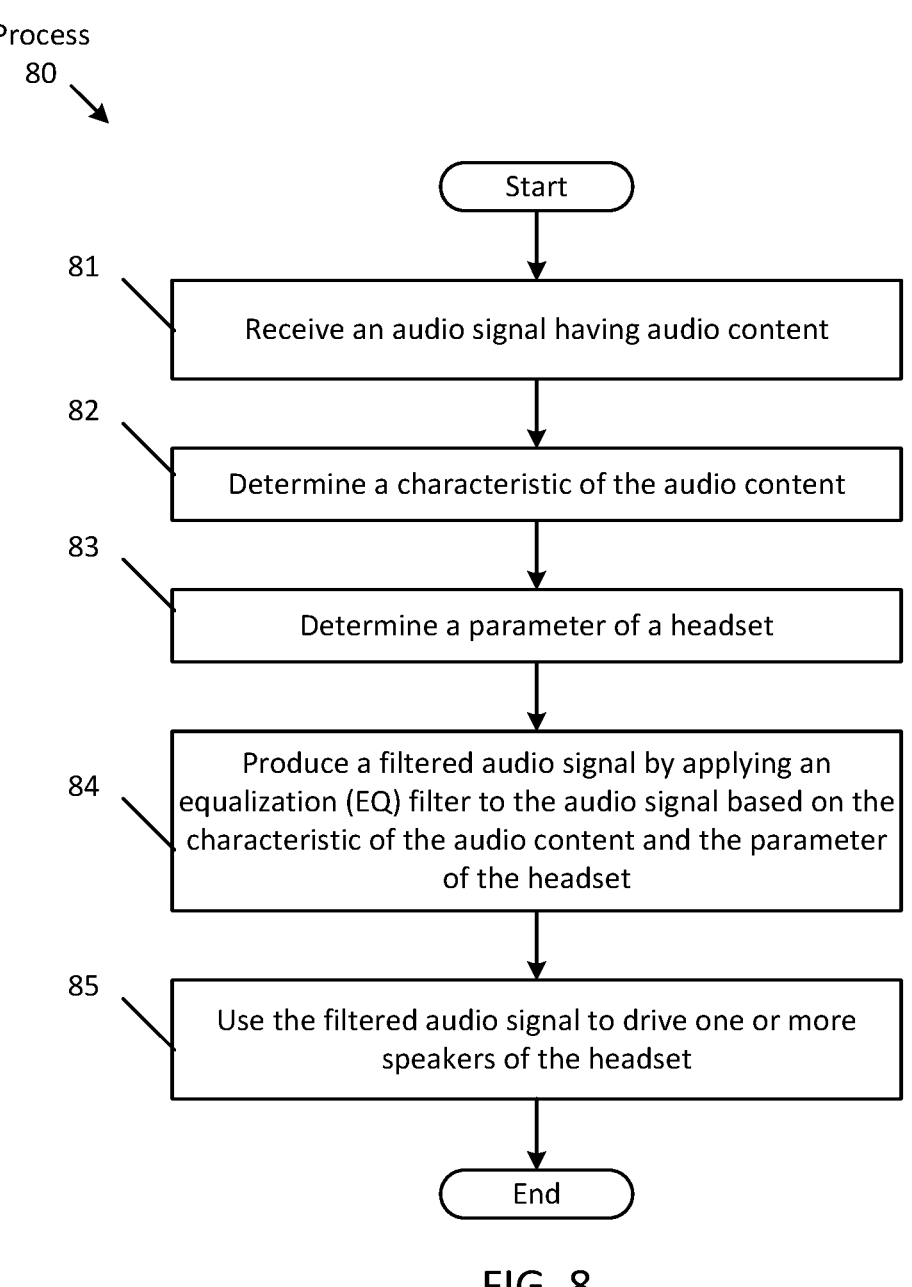
FIG. 8 is a flowchart of a process for performing loudness compensation according to one aspect.

FIG. 8 is a flowchart of a process 80 for performing loudness compensation according to one aspect. In one aspect, the operation may be performed by at least one device, such as the (e.g., controller 30 of the) playback device 12, of the audio system 10. For example, the process 80 begins by the controller 30 receiving an audio signal having audio content (at block 81). The controller 30 determines a characteristic of the audio content (at block 82). The controller determines a parameter of a headset (at block 83). The controller produces a filtered audio signal by applying an EQ filter to the audio signal based on the characteristic of the audio content and the parameter of the headset (at block 84). The controller uses the filtered audio signal to drive one or more speakers of the headset (at block 85). For instance, the playback device may transmit (e.g., over a wireless connection) the filtered signal to the output device to be used to drive one or more speakers of the output device. In another aspect, the (e.g., controller 20 of the) audio output device 13 may perform the process 80 for loudness compensation.

In one aspect, one or more EQ filters are generated using a psychoacoustic model (e.g., as output of model 33) that has input based on one or more characteristics of audio content and one or more parameter of the audio output device. In another aspect, generating the EQ filter includes determining several EQ filters as output of the model responsive to the characteristic and parameter as input, determining a volume setting of the audio system (e.g., a volume setting of a volume control, such as control 16), and selecting the EQ filter (from the several EQ filters) based on the volume setting. In particular, the model 33 may generate one or more EQ filters for at least some volume settings of the audio system.

In one aspect, a volume setting threshold may be a first volume threshold, wherein a (current) volume setting may be a second volume threshold that is less than the first volume threshold, wherein, responsive to an adjustment to the volume setting of the system being less than the second volume threshold, the system may continue to produce the filtered audio signal by applying at least two EQ filters associated with the second volume threshold to the audio signal. In one aspect, responsive to the adjustment to the volume setting begin greater than the first volume setting threshold, the system may continue to drive the one or more speakers with the audio signal. In particular, continuing to drive the one or more speakers with the audio signal may include ceasing to apply one or more EQ filters to the audio signal.

In one aspect, the audio content includes a musical composition. In another aspect, the characteristic includes a genre of the musical composition. In some aspects, the audio content includes a soundtrack of a motion picture. In another aspect, determining the characteristic of the audio content includes using metadata associated with the audio signal (e.g., received with the audio signal) to identity the characteristic. In one aspect, determining the characteristic includes performing a spectral analysis of the audio signal to determine spectral content associated with the audio signal. In some aspects, the spectral content may be wideband spectral content that extends across one or more frequency bands.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

As previously explained, an aspect of the disclosure may be a non-transitory machine-readable medium (such as microelectronic memory) having stored thereon instructions, which program one or more data processing components (generically referred to here as a "processor") to perform the network operations, loudness compensation operations, and (other) audio signal processing operations, as described herein. In other aspects, some of these operations might be performed by specific hardware components that contain hardwired logic. Those operations might alternatively be performed by any combination of programmed data processing components and fixed hardwired circuit components.

While certain aspects have been described and shown in the accompanying drawings, it is to be understood that such aspects are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting.

In some aspects, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some aspects, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

What is claimed is:

1. A method performed by an audio system comprising a headset for playing back audio, the method comprising:
    receiving an audio signal having audio content;
    determining a characteristic of the audio content;
    determining a parameter of the headset;
    producing a filtered audio signal by applying an equalization (EQ) filter to the audio signal based on the characteristic of the audio content and the parameter of the headset; and
    driving one or more speakers of the headset using the filtered audio signal to produce sound at a first playback output level, wherein the sound produced at the first playback output level has a same tonal balance as the sound produced at a second playback output level.

2. The method of claim 1, wherein the same tonal balance of the sound is defined by an audio content producer of the audio content or by a user of the headset.

3. The method of claim 1, wherein the characteristic comprises at least one of:

a description of the audio content;

spectral content associated with the audio signal; or an audio level of the audio signal.

4. The method of claim 1, wherein the first playback output level is associated with a first volume setting and the second playback output level is associated with a second volume setting that is different than the first volume setting.

5. The method of claim 4, wherein the second volume setting is higher than the first volume setting.

6. The method of claim 4 further comprising:

determining that the first volume setting has changed to a third volume setting;

determining a different EQ filter based on the third volume setting;

producing a new filtered audio signal by applying the different EQ filter; and using the new filtered audio signal to drive the one or more speakers of the headset to produce the sound at a third playback output level while maintaining the same tonal balance.

7. The method of claim 1 further comprising:

receiving an adjustment to a volume setting of the audio system;

determining whether the adjustment to the volume setting is equal to or below a volume setting threshold;

responsive to the adjustment to the volume setting being equal to a volume setting threshold, using the audio signal to drive the one or more speakers of the headset; and responsive to the adjustment to the volume setting being less than the volume setting threshold, determining a new EQ filter according to the adjustment of the volume setting.

8. The method of claim 1, wherein the parameter of the headset is a model of the headset.

9. A non-transitory machine-readable medium having instructions which when executed by at least one processor of an audio system comprising a headset causes the audio system to:

receive an audio signal having audio content, the audio signal for driving one or more speakers of the headset;

receive a volume setting of the audio system;

determine, using a psychoacoustic model that has input based on the audio content and the volume setting, a first equalization (EQ) filter and a second EQ filter, wherein, the first EQ filter for applying a first set of gains across a first frequency range, and the second EQ filter for applying a second set of gains across a second frequency range that is higher than the first frequency range; and produce a filtered audio signal by applying the first and second EQ filters to the audio signal, wherein the filtered audio signal has a same tonal balance as the audio signal.

10. The non-transitory machine-readable medium of claim 9, wherein the first frequency range is a low-frequency range, and the second frequency range is a high-frequency range that does not overlap the low-frequency range.

11. The non-transitory machine-readable medium of claim 9, wherein the first and second EQ filters define an optimal perceived loudness and tonal balance for the filtered audio signal according to the volume setting.

12. The non-transitory machine-readable medium of claim 9, wherein the same tonal balance as is defined by an audio content producer of the audio signal or a user of the headset.

13. The non-transitory machine-readable medium of claim 9, wherein the volume setting is a first volume setting and the filtered audio signal is a first filtered audio signal, wherein the non-transitory machine-readable medium comprises further instructions to:

receive a second volume setting that is less than the first volume setting;

determine, using the psychoacoustic model that has input based on the audio content and the second volume setting, at least one of a third EQ filter and a fourth EQ filter; and produce a second filtered audio signal by applying the at least one of the third and fourth EQ filters to the audio signal, wherein the second filtered audio signal has the same tonal balance as the first filtered audio signal.

14. The non-transitory machine-readable medium of claim 9 further comprising instructions to determine a characteristic of the audio content, wherein the first and second EQ filters are determined as output of the psychoacoustic model responsive to input based on the characteristic and the volume setting.

15. A headset comprising:

a speaker;

at least one processor; and memory having stored therein instructions which when executed by the at least one processor causes the headset to:

receive an audio signal having audio content, determine a characteristic of the audio content;

determine a parameter of the headset;

produce a filtered audio signal by applying an equalization (EQ) filter to the audio signal based on the characteristic of the audio content and the parameter of the headset; and drive the speaker using the filtered audio signal to produce sound at a first playback output level, wherein the sound produced at the first playback output level has a same tonal balance as the sound produced at a second playback output level.

16. The headset of claim 15, wherein of the same tonal balance of the sound is defined by an audio content producer of the audio content or by a user of the headset.

17. The headset of claim 15, wherein the characteristic comprises at least one of:

a description of the audio content;

spectral content associated with the audio signal; or an audio level of the audio signal.

18. The headset of claim 15, wherein the first playback output level is associated with a first volume setting and the second playback output level is associated with a second volume setting that is different than the first volume setting.

19. The headset of claim 18, wherein the second volume setting is higher than the first volume setting.

20. The headset of claim 18, wherein the memory has further instructions to:

determine that the first volume setting has changed to a third volume setting;

determine a different EQ filter based on the third volume setting;

produce a new filtered audio signal by applying the different EQ filter; and use the new filtered audio signal to drive the speaker of the headset to produce the sound at a third playback output level while maintaining the same tonal balance.

\* \* \* \* \*